US008933960B2

(12) United States Patent
Lindahl et al.

(10) Patent No.: US 8,933,960 B2
(45) Date of Patent: Jan. 13, 2015

(54) IMAGE ALTERATION TECHNIQUES

(75) Inventors: Aram Lindahl, Menlo Park, CA (US); Kelvin Chiu, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1009 days.

(21) Appl. No.: 12/541,597

(22) Filed: Aug. 14, 2009

(65) Prior Publication Data

US 2011/0037777 A1 Feb. 17, 2011

(51) Int. Cl.
| | |
|---|---|
| G09G 5/00 | (2006.01) |
| H04N 5/232 | (2006.01) |
| H04N 5/262 | (2006.01) |
| H04N 21/414 | (2011.01) |
| G06F 3/0484 | (2013.01) |
| H04N 21/422 | (2011.01) |
| G06F 1/16 | (2006.01) |
| H04N 21/81 | (2011.01) |
| G06T 13/00 | (2011.01) |
| G06F 3/0481 | (2013.01) |
| H04N 21/472 | (2011.01) |
| G06F 3/16 | (2006.01) |
| H04M 1/725 | (2006.01) |

(52) U.S. Cl.
CPC ........ G06F 3/04817 (2013.01); H04N 5/23216 (2013.01); *G06F 2200/1637* (2013.01); H04N 5/2621 (2013.01); H04N 21/41407 (2013.01); *G06F 3/167* (2013.01); G06F 3/04845 (2013.01); H04M 1/72558 (2013.01); H04N 21/42203 (2013.01); G06F 1/1626 (2013.01); *H04M 2250/22* (2013.01); H04M 1/72522 (2013.01); H04N 21/42202 (2013.01); H04N 21/8153 (2013.01); *H04M 2250/12* (2013.01); G06T 13/00 (2013.01); H04N 21/47205 (2013.01)

USPC .......................... 345/619; 345/660; 345/672

(58) Field of Classification Search
None
See application file for complete search history.

(56) References Cited

U.S. PATENT DOCUMENTS

| | | | |
|---|---|---|---|
| 5,758,043 A | 5/1998 | Takizawa et al. | |
| 5,886,697 A | 3/1999 | Naughton et al. | |
| 5,917,488 A | 6/1999 | Anderson et al. | |
| 6,044,408 A | 3/2000 | Engstrom et al. | |
| 6,122,411 A | 9/2000 | Shen et al. | |
| 6,369,822 B1 * | 4/2002 | Peevers et al. | 345/473 |
| 6,473,085 B1 | 10/2002 | Brock et al. | |
| 6,847,467 B2 | 1/2005 | Obrador | |

(Continued)

OTHER PUBLICATIONS

U.S. Appl. No. 12/556,380, filed Sep. 9, 2009, Aram Lindahl et al.

(Continued)

*Primary Examiner* — Kee M Tung
*Assistant Examiner* — Ryan M Gray
(74) *Attorney, Agent, or Firm* — Wong, Cabello, Lutsch, Rutherford & Brucculeri, LLP

(57) ABSTRACT

Various techniques relating to the alteration of image data are provided herein. In generally, disclosed embodiments may provide techniques for applying on or more image alteration effects to image data that is displayed on an electronic device. In certain disclosed embodiments, the application of such image alteration effects may be triggered based upon various detected device operation events, which may include audio-related events, motion-related events, location-related events, and/or events relating the imaging properties. The selection of a triggering device event and a corresponding image alteration affect may be defined by a user through a set of user preference settings on the electronic device.

10 Claims, 22 Drawing Sheets

(56) References Cited

U.S. PATENT DOCUMENTS

| | | | |
|---|---|---|---|
| 7,050,102 B1 | 5/2006 | Vincent | |
| 7,187,401 B2 | 3/2007 | Alhadef et al. | |
| 7,412,360 B2 | 8/2008 | Surazhsky et al. | |
| 1,254,159 A1 | 8/2009 | Lindahl | |
| 7,586,032 B2 * | 9/2009 | Louis | 84/615 |
| 7,830,381 B2 | 11/2010 | Lundstrom et al. | |
| 7,924,328 B2 * | 4/2011 | Cazier et al. | 348/239 |
| 7,969,447 B2 | 6/2011 | Scheepers et al. | |
| 8,015,245 B2 * | 9/2011 | Milic-Frayling et al. | 709/204 |
| 8,051,376 B2 * | 11/2011 | Adhikari et al. | 715/727 |
| 8,073,203 B2 * | 12/2011 | Tang et al. | 382/107 |
| 8,099,462 B2 * | 1/2012 | Sheng et al. | 709/204 |
| 2005/0273331 A1 | 12/2005 | Lu | |
| 2006/0072019 A1 | 4/2006 | Stavely et al. | |
| 2006/0181537 A1 * | 8/2006 | Vasan et al. | 345/473 |
| 2007/0283269 A1 | 12/2007 | Obrador et al. | |
| 2008/0012856 A1 | 1/2008 | Yu et al. | |
| 2008/0089525 A1 * | 4/2008 | Kauko | 381/58 |
| 2008/0298705 A1 * | 12/2008 | Jeong | 382/254 |
| 2009/0163182 A1 * | 6/2009 | Gatti et al. | 455/414.1 |
| 2009/0184849 A1 * | 7/2009 | Nasiri et al. | 341/20 |
| 2009/0207175 A1 | 8/2009 | Warner | |
| 2009/0219168 A1 * | 9/2009 | Loper | 340/825 |
| 2009/0284541 A1 * | 11/2009 | Liu | 345/581 |
| 2010/0045796 A1 | 2/2010 | Fraley et al. | |
| 2010/0066763 A1 * | 3/2010 | MacDougall et al. | 345/656 |
| 2010/0085379 A1 * | 4/2010 | Hishikawa et al. | 345/619 |
| 2010/0134485 A1 | 6/2010 | Bhogal et al. | |
| 2010/0177247 A1 | 7/2010 | Sekulovski | |
| 2010/0191459 A1 | 7/2010 | Carter | |
| 2010/0214483 A1 | 8/2010 | Gann | |
| 2010/0286972 A1 | 11/2010 | Callegari | |
| 2010/0303146 A1 | 12/2010 | Kamay | |
| 2010/0315423 A1 | 12/2010 | Ahn et al. | |
| 2012/0081382 A1 | 4/2012 | Lindahl et al. | |

OTHER PUBLICATIONS

Adobe, "Adobe® After Effects® CS4 help".

"Photoshop Water Tutorial" http://www.secondpicture.com/tutorials/digital_image_processing/photoshop_water_tutorial.html.

"Animated Spiral Tutorial", http://www.hypnoticaddiction.com/tutorials/63-animated-spiral-tutorial.html.

Yufen Feng, "Research on Dynamic Water Surface and Ripple Animation", I.J. Information Technology and Computer Science, 2010, 1, 18-24.

GPU Gems Chapter 1.

GPU Gem Chapter 2.

Adobe, "After Effects Help / Managing and animating shape paths and masks", http://helpx.adobe.com/after-effects/using/animating-shape-paths-masks.html.

Adobe, "After Effects / Effects and animation presets overview", http://help.adobe.com/en_US/aftereffects/cs/using/WS3878526689cb91655866c1103906c6dea-7c30a.html.

* cited by examiner

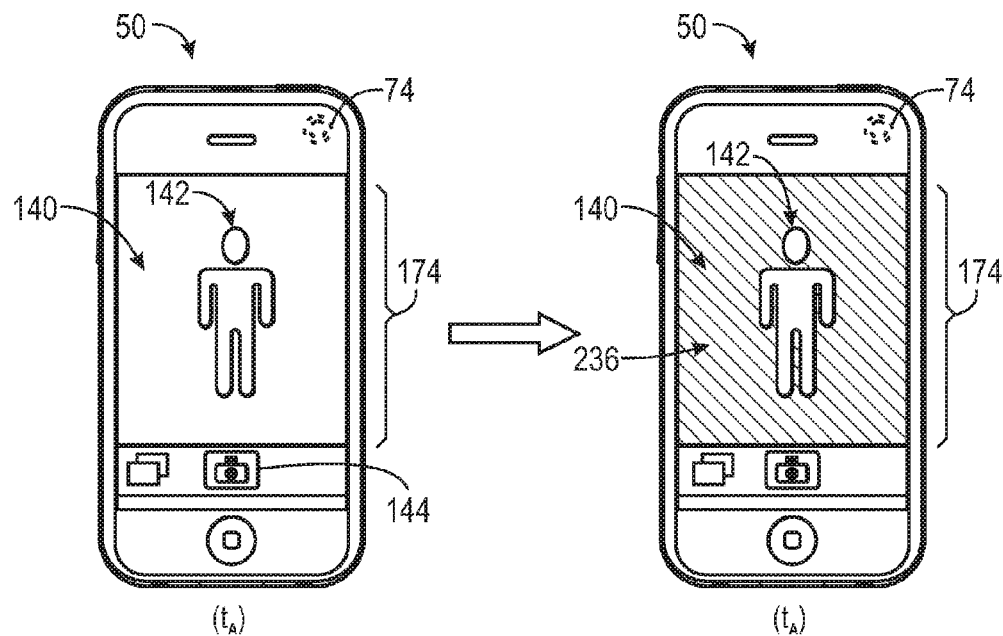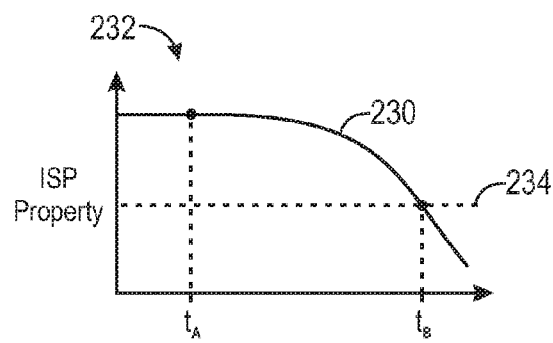
FIG. 17

IMAGE ALTERATION TECHNIQUES

BACKGROUND

The present disclosure relates generally to the capture and/or display of image data on an electronic device and, more specifically, to techniques for altering the appearance of the image data in response to the occurrence of one or more device operation events.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, the trend in consumer electronics is to combine multiple functionalities into a single portable electronic device. For example, cell phones and media players are no longer merely distinct devices, each with their own unique capabilities. Rather, cell phone and media player functionalities can now be merged into one multimedia device with a multitude of capabilities. Indeed, many modern cell phones, digital media players, and even laptop computers are often capable of providing for a number of additional functionalities, which may include: playing video games, providing for GPS location and navigation functions, providing for network communication functions (e.g., e-mail, text messaging, web-surfing, etc.), playing audio files, and displaying image data, the latter of which may include displaying image data (e.g., pictures and/or video files) stored on the electronic device, captured by the electronic device (e.g., using an integrated camera), or streamed and/or downloaded over a network, such as the Internet.

With regard to the display and/or playback of image data, graphics editing applications, which may apply one or more image alteration effects to manipulate an image prior to it being displayed on the electronic device, have become increasingly popular in recent years as a means by which users may create altered images based upon their own creative and artistic initiatives. For instance, such altered images may differ in appearance from the original image, but may nonetheless provide the creator an aesthetically pleasing viewing experience. In most conventional graphics editing environments, image alteration effects are typically selected and applied manually "on-demand" in response to specific user inputs or requests. Unfortunately, this reliance on continued user inputs may limit the creative gamut of the altered images that may be created.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for applying one or more image alteration effects to image data displayed on an electronic device. In certain disclosed embodiments, the application of such image alteration effects may be triggered based upon the detection of certain device operation events, which may include audio-related events, motion-related events, location-related events, or events relating the imaging properties. The relationship between an image alteration effect and a corresponding triggering event(s) may be defined by a user. As will be appreciated, one or more aspects of the image alteration techniques described herein may be configured via user preference settings, which may be part of a graphical user interface displayed on the electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 17 shows an embodiment in which image data displayed on the electronic device of FIG. 2 is altered based upon at least one imaging property detected by an imaging device that is incorporated into the device of FIG. 2, in accordance with aspects of the present disclosure;

DETAILED DESCRIPTION OF SPECIFIC EMBODIMENTS

Figure 1:
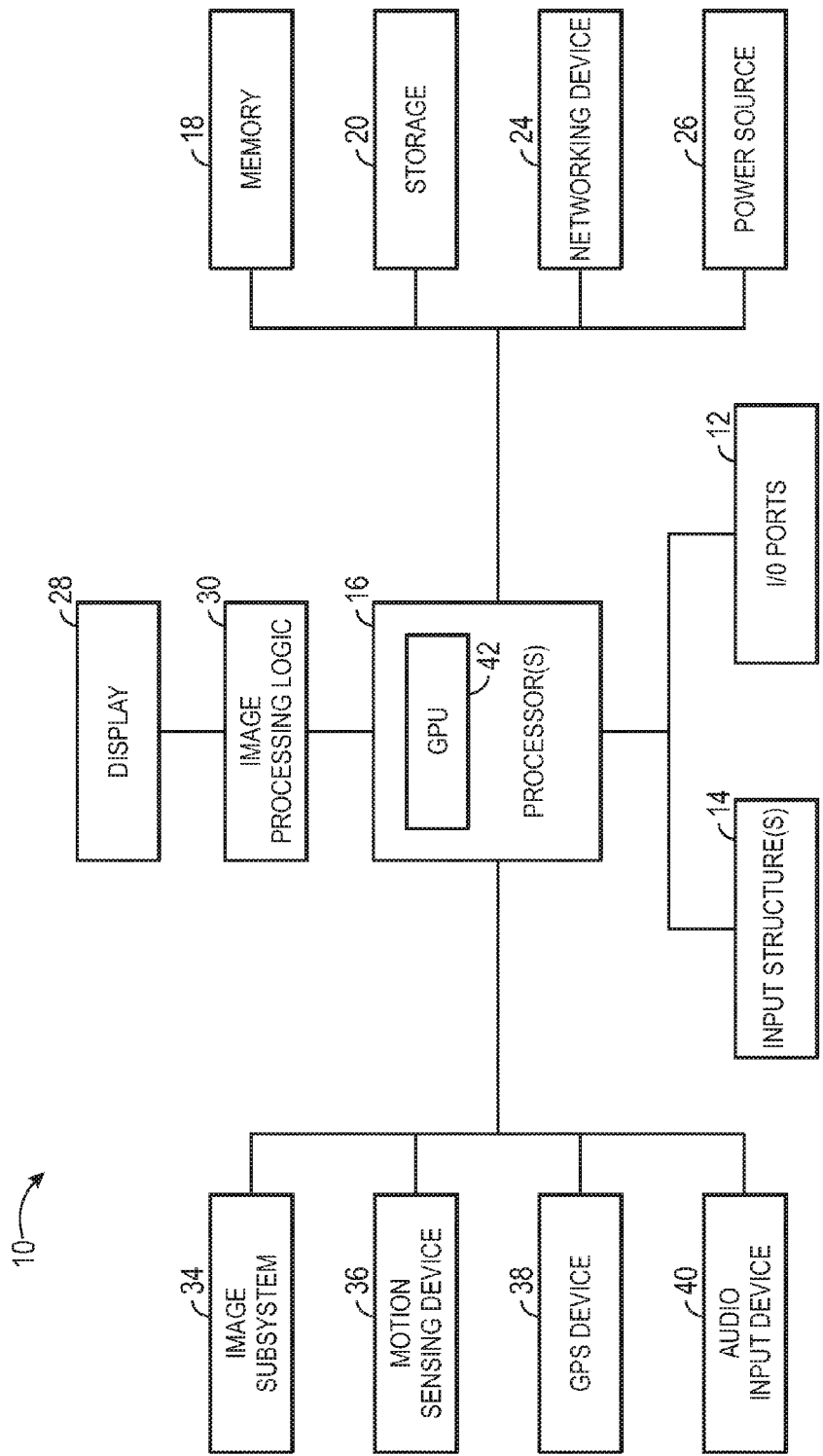
FIG. 1 is a simplified block diagram depicting components of an electronic device that may include image alteration functions, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As discussed above, many conventional graphics editing programs rely upon "on-demand" user commands and inputs (e.g., through a graphical user interface) to apply image alteration effects to image data. For instance, such user commands and/or inputs may include the selection of a particular image alteration effect at a given time, such as during the playback of a video file. However, due to the reliance on continued "user inputs," which should be understood to mean user inputs that are specifically provided to a graphics editing program to facilitate on-demand image alteration requests, the creativity of the altered image results that may be achieved using conventional graphics editing applications is somewhat limited. As such, it may be beneficial to provide techniques by which image alteration may be automatically triggered upon the detection of certain events that may occur during device operation, such as an audio-related event or motion-related event. This may provide for a broader range of creative image alteration functions, thereby improving the overall user experience.

Accordingly, the present disclosure provides various techniques for automatically altering image data that is to be displayed on a display of an electronic device in response to one or more detected device operation events. For instance, in certain embodiments, the electronic device may include image processing logic configured to apply an image alteration effect to image data in response to an audio-related event, a motion-related event, a location-related event, or an image capture event. In some embodiments, different image alteration effects may be associated with different types of events. For instance, a first image alteration effect may be applied upon the detection of a first type of audio event, and a second image alteration effect may be applied upon the detection of a second type of audio event or, alternatively, a motion, location, or image capture event. Based upon the times at which the events are detected, the first and second image alteration effects may be applied separately or concurrently by the image processing logic without the need for additional user inputs. In another embodiment, the image processing logic may be configured such that a particular image alteration effect may be responsive to two or more device operation events. In yet another embodiment, a random image alteration effect may be selected and applied to image data upon the detection of a particular device operation event.

In other words, the alteration of image data, in accordance with the presently disclosed techniques, may be automatically triggered by various device operation events, as opposed to relying upon continued user commands in a conventional graphics editing program setting. In some embodiments, the selection of both a device operation event(s) that may trigger image alteration, as well as the selection of an image alteration effect(s) that is to be triggered in response to the selected event(s) (which may be referred to as an "image alteration rule"), may be configured or defined through user preference settings on the electronic device. As will be discussed further below, because the presently disclosed image alteration techniques are highly flexible in allowing a user to select from various types of operation event(s) for triggering particular image alteration effects, a great number of user-defined image alteration rules is possible. In this manner, the presently disclosed techniques may provide for a wide range of image alteration capabilities, thus enhancing the overall user experience.

Before continuing, several of the terms mentioned above, which will be used extensively throughout the present disclosure, will be first defined in order to facilitate a better understanding of disclosed subject matter. For instance, as used herein, the term "image alteration" or "image manipulation" or the like shall be understood to mean the application of an image alteration effect to a digital image, which may be a still image (e.g., picture) or a moving image (e.g., video/movie). An "image alteration effect" shall be understood to mean any type of image effect (such as a filter or shape manipulation effect) that alters or otherwise changes the appearance of an original image to which the image alteration effect is applied.

By way of example only, such image alteration effects may include any one of the various effects provided in the Photo Booth® software program (available from Apple Inc. of Cupertino, Calif.), such as sepia, black and white, glow, colored pencil, thermal camera, x-ray, pop art, comic, bulge, dent, twirl, squeeze, mirror, light tunnel, fisheye, or stretch effects, to name just a few. Image alteration effects may also include other types of effects, such as a water reflection effect, a spiral effect, a depth-changing ("zooming") effect, a brush-stroke effect, a night vision effect, and more. Thus, it should be understood that "image alteration" does not necessarily mean that the original image data is permanently modified, but rather that an image alteration effect is applied to the image data, such that the desired alteration effect is visible when the image data is displayed by an electronic device for viewing a by user. Additionally, it should be understood that the application of an "image alteration effect" means that the applied effect changes the appearance of the image data in some way other than merely altering the orientation of the image (e.g., switching from a portrait to a landscape view), as displayed on an electronic device.

Further, the term "device operation event" or the like shall be understood to refer to certain events that occur during operation of the electronic device mentioned above, which may be used to trigger the application of an image alteration effect to a particular image. For instance, as will be discussed below, device operation events may include audio events, which may include certain audio properties detected during audio playback (e.g., a music file or the audio portion of a video file) or by analyzing audio signals received through an audio input device (e.g., a voice recording received via a microphone). Device operation events may also include motion-related events detected by a motion sensing device, such as an accelerometer. In further embodiments, image alteration effects may also be triggered by location events (e.g., determined by global positioning satellite (GPS) coordinates) and/or by image capture events, which may include the detection of certain lighting conditions, exposure values, sharpness data, etc., via an imaging subsystem of the electronic device. An image capture event may also include detecting the presence of a new object or subject entering the imaging acquisition frame. Accordingly, the term "image alteration rule" or the like shall be understood to refer to a defined relationship (e.g., defined through user preference settings) by which a particular device operation event triggers a particular image alteration effect. Further, it should be understood that a "device operation event" may refer to the occurrence of a single discrete event, or may refer to a continuous change in a particular parameter over time, such that image alteration is based upon the change in the parameter. It should also be understood that "device operation events" are meant to exclude specific "on-demand" user commands or inputs that directly request the application of an image alteration effect to image data, such as those received directly through a graphics editing program or setting, as discussed above.

Keeping the above points in mind, FIG. 1 is a block diagram illustrating an example of an electronic device, referred to by reference number 10, which may be configured to implement the above-discussed image alteration techniques, in accordance with one embodiment of the present disclosure. Electronic device 10 may be any type of electronic device that includes capabilities for displaying image data, which may include still images (e.g., pictures) or moving images (e.g., video), such as a portable media player, a mobile phone, a laptop computer, or the like. By way of example only, electronic device 10 may be a portable electronic device, such as a model of an iPod® or iPhone® available from Apple Inc. In another embodiment, electronic device 10 may be a desktop or laptop computer, including a MacBook®, MacBook® Pro, MacBook Air®, iMac®, Mac® Mini, or Mac Pro®, also available from Apple Inc. In further embodiments, electronic device 10 may be a model of an electronic device from another manufacturer that is capable of displaying image data. As will be discussed further below, electronic device 10 may include circuitry or logic (e.g., image processing logic 30) configured to process image data in response to one or more device operation events, which may include audio-related events, motion-related events, location-related events, or image capture events, to name just a few.

As shown in FIG. 1, electronic device 10 may include various internal and/or external components which contribute to the function of device 10. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in electronic device 10. For example, in the presently illustrated embodiment, these components may include input/output (I/O) ports 12, input structures 14, one or more processors 16, memory device 18, non-volatile storage 20, networking device 24, power source 26, display 28, and image processing logic 30. Electronic device 10 may additionally include imaging subsystem 34, motion sensing device 36, positioning device 38, and audio input device 40, all of which may contribute to operation events that may be utilized by imaging processing logic 30 to trigger the processing of image data that is output to display 28 using one or more image alteration effects.

With regard to each of the illustrated components, I/O ports 12 may include ports configured to connect to a variety of external devices, such as headphones, or other electronic devices, such as computers, printers, projectors, external displays, modems, docking stations, and so forth. I/O ports 12 may support any interface type, such as a universal serial bus (USB) port, an IEEE-1394 port, and/or an AC/DC power connection port. In one embodiment, I/O ports 12 may include a proprietary port from Apple Inc. that may function to charge power source 26 (which may include one or more rechargeable batteries) of device 10, or transfer data between device 10 and an external source.

Input structures 14 may provide user input or feedback to processor(s) 16. For instance, input structures 14 may be configured to control one or more functions of electronic device 10, applications running on electronic device 10, and/or any interfaces or devices connected to or used by electronic device 10. By way of example only, input structures 14 may include buttons, sliders, switches, control pads, keys, knobs, scroll wheels, keyboards, mice, touchpads, and so forth, or some combination thereof. In one embodiment, input structures 14 may allow a user to navigate a graphical user interface (GUI) displayed on display 28. Further, in certain embodiments, input structures 14 may include a touch sensitive mechanism provided in conjunction with display 28. In such embodiments, a user may select or interact with displayed interface elements via the touch sensitive mechanism.

Processor(s) 16 may include one or more microprocessors, such as one or more "general-purpose" microprocessors, one or more application-specific processors (ASICs), or a combination of such processing components, which may control the general operation of electronic device 10. For example, processor(s) 16 may include one or more instruction set processors (e.g., RISC), graphics processors, audio processors and/or other related chipsets. In the illustrated embodiment, processor(s) 16 may include graphics processor (GPU) 42, which may operate in conjunction with image processing logic 30 to provide for the alteration of image data output via display 28 in response to one or more device operation events, as will be discussed in further detail below.

Instructions or data to be processed by processor(s) 16 may be stored in memory 18, which may be a volatile memory, such as random access memory (RAM), or as a non-volatile memory, such as read-only memory (ROM), or as a combination of RAM and ROM devices. Memory 18 may store firmware for electronic device 10, such as a basic input/output system (BIOS), an operating system, various programs, applications, or any other routines that may be executed on electronic device 10, including user interface functions, processor functions, and so forth. In addition, memory 18 may include one or more frame buffers for buffering or caching image data, including unprocessed (e.g., original) and processed (e.g., altered) image data.

The illustrated components may further include other forms of computer-readable media, such as non-volatile storage device 20, which may be utilized for persistent storage of data and/or instructions. Non-volatile storage 20 may include flash memory, a hard drive, or any other optical, magnetic, and/or solid-state storage media. By way of example, non-volatile storage 20 may be used to store data files, such as image data. For instance, in some embodiments, the image data that is processed by image processing logic 30 prior to being output to display 28 may be a still image file (e.g., picture) or a video file stored in storage device 20.

The components depicted in FIG. 1 further include network device 24, which may be a network controller or a network interface card (NIC). For example, network device 24 may provide for network connectivity over any wireless 802.11 standard or any other suitable networking standard, such as a local area network (LAN), a wide area network (WAN), such as an Enhanced Data Rates for GSM Evolution (EDGE) network or a 3G data network (e.g., based on the IMT-2000 standard), or the Internet. In certain embodiments, network device 24 may provide for a connection to an online digital media content provider, such as the iTunes® service, available from Apple Inc., through which a user may access, stream, or download digital video to electronic device 10, which may then be played back and processed by image processing logic 30 in accordance with one or more of the image alteration techniques disclosed herein.

Display 28 may be used to display image data, which may include stored image data (e.g., picture or video files stored in storage device 20), streamed image data (e.g., from network device 24), as well as live captured image data (e.g., via imaging subsystem 34). Additionally, display 28 may display various images generated by the device 10, including a GUI for an operating system or other application. Display 28 may be any suitable display such as a liquid crystal display (LCD), plasma display, or an organic light emitting diode (OLED) display, for example. In one embodiment, display 28 may be provided in conjunction with a touch screen that may function as part of a control interface for device 10.

As mentioned above, electronic device 10 may include image processing logic 30, which may be configured to provide for the alteration of image data that is to be output to display 28 in response to one or more device operation events. As will be discussed below, device operation events may include audio events (e.g., provided by audio input device 40), motion events (e.g., provided by motion sensing device 36), location events (e.g., provided by positioning device 38), or image capture events (e.g., provided by imaging subsystem 34), or some combination thereof. Based upon a set of user preferences, which may include one or more defined image alteration rules, image processing logic 30 (in cooperation with GPU 42), upon detecting a triggering device operation event, may apply a corresponding image alteration effect or effects to image data as it is displayed on display 28.

The various components 34, 36, 38, and 40 that may contribute to device operation events in the presently illustrated embodiment will now be described beginning with imaging subsystem 34. Imaging subsystem 34 may be configured to capture still or moving images. For instance, imaging subsystem 34 may include one or more cameras having a plurality of image sensors, as well as an image signal processor (ISP), which may be part of processor(s) 16). As will be appreciated, the ISP may process data acquired via the image sensors to generate a digital representation of the captured data, which may be displayed and/or stored on device 10. As will be discussed further below, certain embodiments may provide for image alteration based upon one or more properties of imaging subsystem 34, such as a detected lighting condition, exposure value, brightness level, sharpness level, or some other type of imaging property.

Motion sensing device 36 may be any device configured to measure motion or acceleration experienced by device 10, such as an accelerometer or a gyroscope. In one embodiment, motion sensing device 36 may be a three-axis accelerometer that includes a sensing element and an integrated circuit interface for providing the measured acceleration and/or motion data to processor(s) 16. Motion sensing device 36 may be configured to sense and measure various types of motion including, but not limited to, velocity, acceleration, rotation, and direction, all of which may be configured to trigger one or more image alteration effects.

Electronic device 10 also includes positioning device 38. By way of example, positioning device 38 may be a GPS system, such as an Assisted GPS (A-GPS) system. Positioning device 38 may be configured to determine the geographic coordinates of device 10. In one embodiment, image processing logic 30 may determine whether or not to apply a particular image alteration effect based upon the geographic position of device 10.

Additionally, electronic device 10 includes audio input device 40, which may be configured to receive audio signals. In one embodiment, audio input device 40 may include one or more audio receivers, such as microphones. Based upon certain audio events, which may be the detection of certain properties of a received audio signal, such as a key, tempo, beat, frequency, volume, spectral content, RMS level, etc., image processing logic 30 may determine whether or not to apply an image alteration effect to an image that is being displayed on display 28. Further, in addition to analyzing audio signals received by audio input device 40, audio events that may trigger image alteration could also be determined via analysis of audio data being played on device 10. For instance, in one embodiment, image alteration may be triggered based on a key, tempo, beat, frequency, volume, spectral content, RMS level, etc., of music data being played on device 10, which may be a song or an audio portion of a concurrently played video file. In the latter case, the audio portion of the video data may trigger image alteration of the video data as it is being played. Still further, one embodiment may provide for image alteration based upon metadata information, such as genre or artist information corresponding to a music or audio file being played back on device 10. As can be appreciated, image alteration effects implemented by image processing logic 30 may include any suitable type of image alteration effect, including, without limitation, the examples listed above, and may be triggered by operation events provided from any of components 34, 36, 38, or 40 depending on user preference settings.

Figure 2:
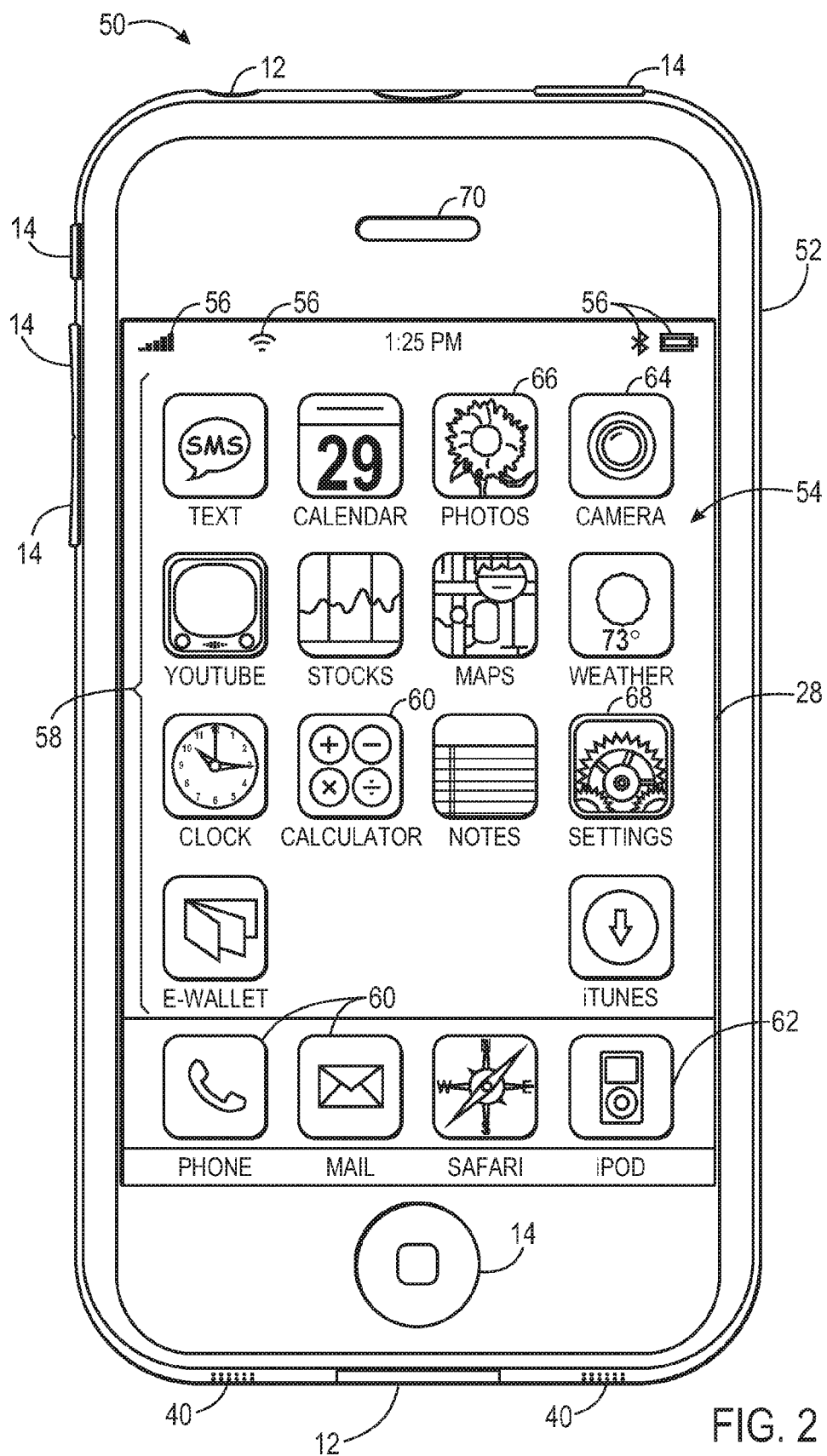
FIG. 2 is a front view showing the electronic device of FIG. 1 in the form of a portable handheld electronic device, in accordance with aspects of the present disclosure.

Referring now to FIG. 2, electronic device 10 is illustrated in the form of portable handheld electronic device 50, which may be a model of an iPod® or iPhone® available from Apple Inc. It should be understood that while the illustrated handheld device 50 is generally described in the context of portable digital media player and/or cellular phone, additional embodiments of handheld device 50 may incorporate the additional functionalities, such as a camera, a portable gaming platform, a personal data organizer, or some combination thereof. Thus, depending on the functionalities provided by handheld electronic device 50, a user may listen to music, play video games, take pictures, and place telephone calls, while moving freely with handheld device 50.

In the depicted embodiment, handheld device 50 includes enclosure 52, which may function to protect the interior components from physical damage and shield them from electromagnetic interference. Enclosure 52 may be formed from any suitable material or combination of materials, such as plastic, metal, or a composite material, and may allow certain frequencies of electromagnetic radiation to pass through to wireless communication circuitry (e.g., network device 24) within device 50.

As shown in the present embodiment, enclosure 52 includes user input structures 14 through which a user may interface with handheld device 50. For instance, each input structure 14 may be configured to control one or more respective device functions when pressed or actuated. By way of example, one or more of input structures 14 may be configured to invoke a "home" screen 54 or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that handheld device 50 may include any number of suitable user input structures existing in various forms including buttons, switches, keys, knobs, scroll wheels, and so forth.

In the illustrated embodiment, display 28 may be provided in the form of a liquid crystal display (LCD), which may display various images generated by handheld device 50. For example, LCD 28 may display various system indicators 56 providing feedback to a user with regard to one or more states of handheld device 50, such as power status, signal strength, external device connections, and so forth. LCD 28 may also display graphical user interface ("GUI") 58 that may allow a user to interact with handheld device 50. GUI 58 may include various layers, windows, screens, templates, or other graphical elements that may be displayed in all, or a portion, of LCD 28. For instance, as shown on home screen 54, GUI 58 may include graphical elements representing applications and functions of device 50.

The graphical elements may include icons 60, each of which may correspond to various applications that may be opened or executed upon detecting a user selection of a respective icon 60. By way of example, one of the icons 60 may represent media player application 62, which may provide for the playback of digital audio and video data stored on device 50, as well as the playback of streamed video data. Another icon 60 may represent camera application 64, which may provide for the capture of still or moving images by a camera which, in one embodiment, may be integrated with handheld device 50. Additionally, one of the icons 60 may also represent a photo browser application 66, by which a user may view images stored on handheld device 50, some of which may have been acquired using camera application 64. Further, one of the icons 60 may represent an application 68 through which a user may set various user preferences for controlling the alteration of image data based upon device operation events. The configuration of such preferences using application 68 will be illustrated and discussed in further detail below with reference to FIGS. 18-20. In some embodiments, the selection of an icon 60 may lead to a hierarchical navigation process, such that selection of an icon 60 leads to a screen that includes one or more additional icons or other GUI elements. As will be appreciated, icons 60 may be selected via a touch screen included in display 28, or may be selected using one of user input structures 14.

As shown, electronic device 50 may include audio input devices 40, which may be provided as one or more microphones. In embodiments where device 50 includes cell phone functionality, audio input devices 40 may be configured to receive user audio input such as a user's voice. In some embodiments, audio input devices 40 may also be integrated with audio output devices, such as speakers, for transmitting audio signals to a user, such as during playback of music data, for example. Further, where electronic device 50 includes a cell phone application, an additional audio output transmitter 70 may be provided, as shown in FIG. 2. Output transmitter 70 may also include one or more speakers configured to transmit audio signals to a user, such as voice data received during a telephone call. Thus, audio input devices 40 and output transmitter 70 may operate in conjunction to function as the audio receiving and transmitting elements of a telephone.

Figure 3:
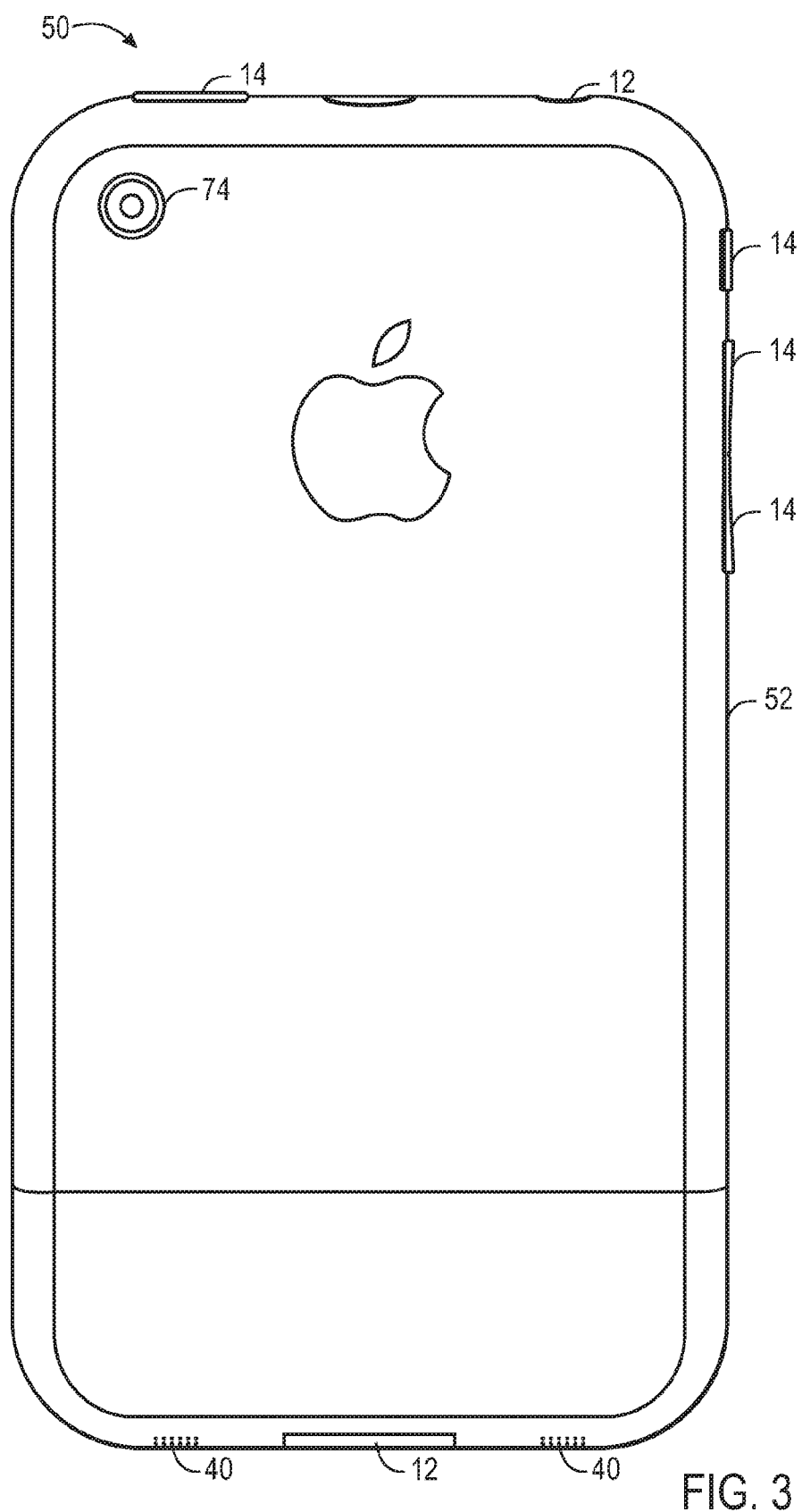
FIG. 3 is a rear view of the electronic device shown in FIG. 2.

Referring briefly to FIG. 3, a rear view of handheld electronic device 50 is illustrated. As shown in FIG. 3, device 50 may include camera 74, which may be used in conjunction with camera application 64 to acquire still or moving images, such as digital photographs or movies. As will be discussed in further detail below, images acquired via camera 74 may be stored on device 50, and may be subsequently processed by image processing logic 30 for the addition of one or more image alteration effects. Additionally, a user may also have the option of configuring device 50 such that image processing logic 30 applies an image alteration effect during image capture, whereby the live captured image data is displayed as having one or more image alteration effects applied as it is being displayed on display 28 (e.g., in substantially real time) and/or being written to storage device 20.

Figure 4:
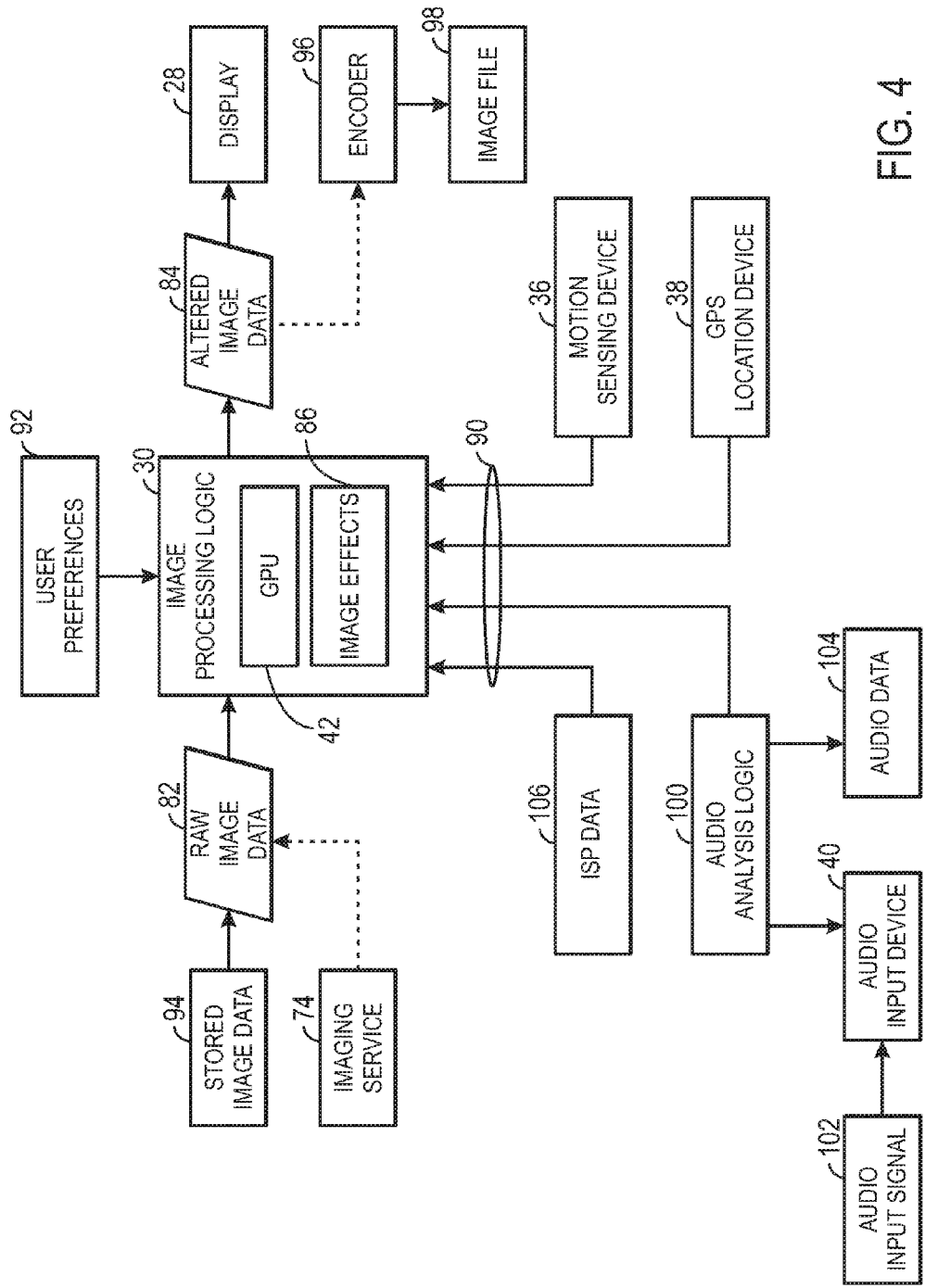
FIG. 4 is a schematic block diagram depicting a technique for altering image data in response to various events that may be detected during operation of the electronic device of FIG. 1, in accordance with aspects of the present disclosure.

Continuing to FIG. 4, a schematic block diagram showing a process by which image data is altered by image processing logic 30 in response to one or more device operation events on device 10 is illustrated, in accordance with aspects of the present technique. As shown in the illustrated embodiment, input image data, referred to as "raw image data" 82, may be captured live (e.g., in substantially real time) using camera 74, or may be played back or viewed from an image file 94 stored on device 10. In a further embodiment, raw image data 82 may be streamed over a network, such as the Internet, in the context of a video conferencing application, such as iChat® (available from Apple Inc.). In processing raw image data 82, image processing logic 30, which may operate in cooperation with GPU 42, may, in response to the occurrence of one or more device operation events 90, apply one or more image alteration effects 86 to raw image data 82 to produce altered image data 84. As discussed above, the association of specific triggering device operation events 90 to corresponding image alteration effects 86 may be configured as "image alteration rules" defined in user preferences 92. Further, while GPU 42 is shown in FIG. 4 as being integrated with image processing logic 30, it should be understood that image processing logic 30 and GPU 42 could also be separate components in other embodiments (e.g., FIG. 1).

As shown, altered image data 84 may be output to display 28 for viewing on device 10. In some embodiments, altered image data 84 may also be stored on device 10 as image file 98. For instance, altered image data 84, which may include still pictures or video data, may be encoded into one or more suitable image formats using encoder 96. For example, where altered image data 84 includes video data, image file 98 may be encoded using a codec into a variety of image file formats, including those based upon H.264, MPEG-4, or 3GP multimedia formats. In one embodiment, image file 98 may be a stored as a QuickTime® file for later playback on device 10 using the QuickTime® Player application, available from Apple Inc. It should be appreciated that any type of suitable video or picture formats may be utilized by encoder 96 for creating image file 98 for storage (e.g., in non-volatile storage 20) on device 10.

As discussed above, device operation events 90 that may contribute to the triggering of image alteration effects 86 may include audio, motion, location, or image capture events. As such, device 10 may also include audio analysis logic 100. Audio analysis logic 100 may be configured to analyze audio signals 102 received by audio input device 40, which may be a microphone in one embodiment. Thus, audio signals 102 received by audio input device 40 may include a user's voice, as well as voice and/or music from external audio sources. Additionally, audio analysis logic 100 may also be configured to analyze the playback of audio data 104 on device 10. Audio data 104 may be, for instance, an audio file being concurrently played with raw image data 82, such as the audio portion of a movie or music video. Accordingly, both audio input signals 102 and audio data 104 may be analyzed by logic 100 for the determination of various audio properties, such as key, tempo, beat, frequency, volume, spectral content, or RMS level properties, as well as properties based upon metadata information, such as genre or artist information. In some embodiments in which audio data 104 is a radio broadcast, metadata information may be determined by analyzing a metadata sub-carrier associated with the broadcast, such as an RDS data signal associated with an FM broadcast. Based upon the determined audio property or properties, image processing logic 30 may determine whether an image alteration effect 86 is to be applied to raw image data 82 (e.g., in accordance with an image alteration rule stored in user preferences 92).

Device 10 may also include image signal processor (ISP) 106, which may operate in cooperation with camera 74 as components of imaging subsystem 34. ISP 106 may process data received from image sensors of camera 74 to generate a digital image representing the data captured by the image sensors. In accordance with the presently described image alteration techniques, certain image capture properties, such as, lighting conditions, sharpness, brightness levels, or exposure values, may be determined by ISP 106 and provided to image processing logic as device operation events 90 which may be used to trigger the alteration of raw image data 82. Further, as will be discussed below in FIG. 22, an image capture event may also include the detection of a subject entering or exiting an image acquisition frame. Additionally, as discussed above, device 10 may include motion sensing device 36 and positioning device 38 to provide motion and location data, respectively, to image processing logic 30, wherein image alteration may be performed if the motion or location data corresponds to an operation event that triggers image alteration, as may be defined in user preferences 92. Thus, to summarize, based, for example, at least partially on image alteration rules established in user preferences 92, image processing logic 30 may apply one or more image alteration effects 86 to raw image data 82 upon the detection of certain triggering device operation events, which may include audio events, motion events, location events, or image capture events, or some combination thereof.

Figure 5:
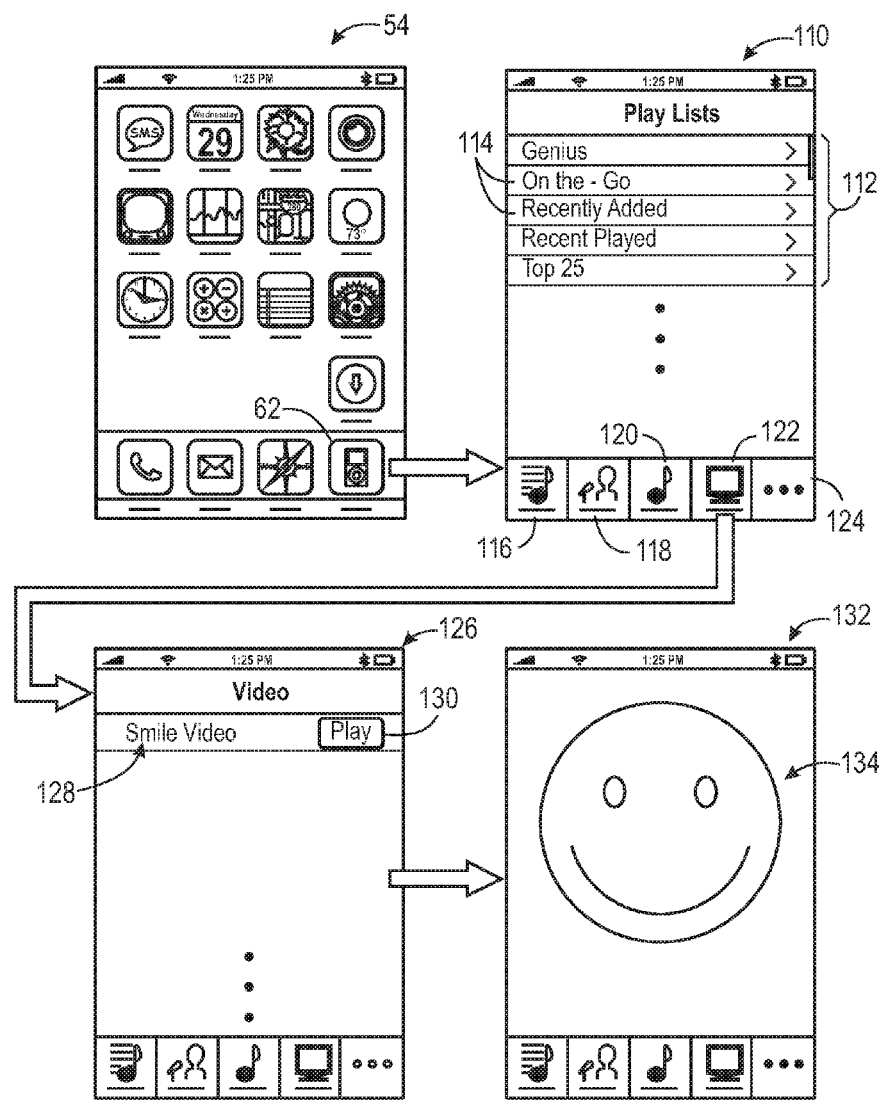
FIG. 5 shows a plurality of screens that may be displayed on the electronic device of FIG. 2 showing a media player application that provides for video playback functions, in accordance with aspects of the present disclosure.
Figure 6:
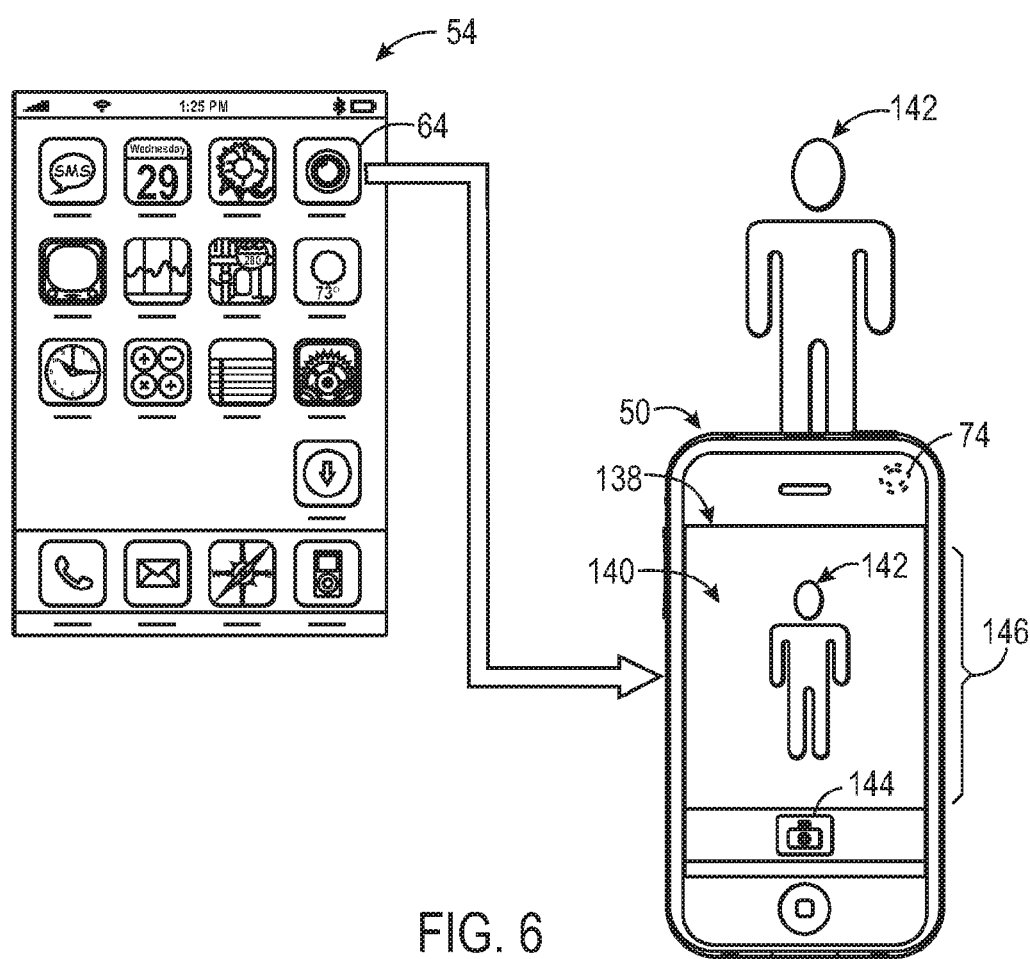
FIG. 6 shows a plurality of screens that may be displayed on the electronic device of FIG. 2 showing an imaging application that may be utilized for acquiring live image data, in accordance with aspects of the present disclosure.
Figure 7:
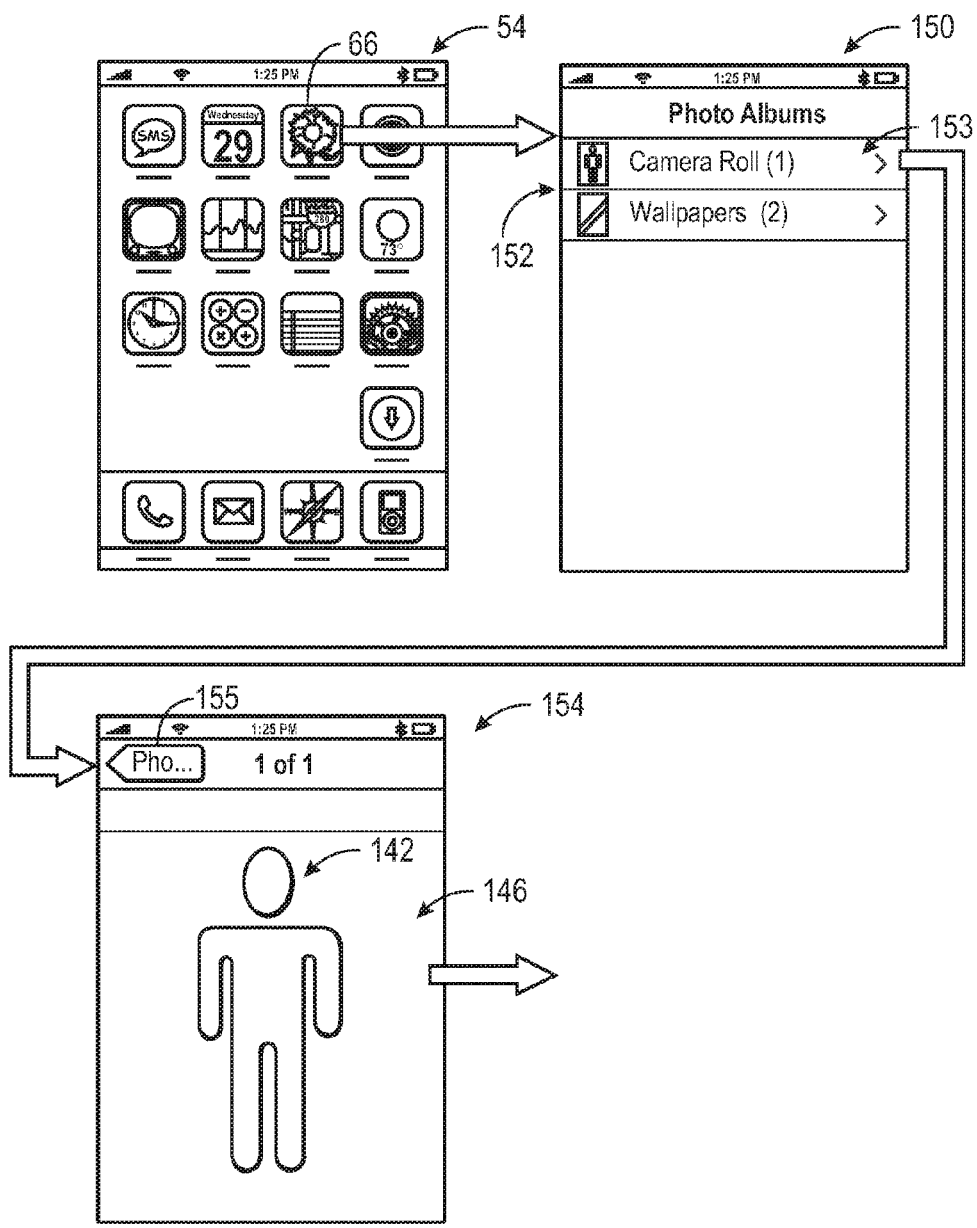
FIG. 7 shows a plurality of screens that may be displayed on the electronic device of FIG. 2 showing an image viewing application that may be utilized for viewing images stored on the device of FIG. 2, in accordance with aspects of the present disclosure.

With the above points in mind, various techniques for acquiring, viewing, or playing back still and moving image data using handheld device 50 are illustrated in FIGS. 5-7 by way of a plurality of screen images that may be displayed on display 28. Particularly, FIG. 5 depicts the playback of a video file using media player application 62, FIG. 6 depicts the live capture of image data using camera 74 and camera application 64, and FIG. 7 depicts the viewing of image data stored on device 50 using photo browser application 66, all in accordance with aspects of the present disclosure. Additionally, FIGS. 18-20, which are discussed further below, also illustrate various screen images for configuring user preferences (e.g., 92) to define one or more types of device operation events that may trigger image alteration. As will be understood, the depicted screen images in FIGS. 5-7 and FIGS. 18-20 may be generated by GUI 58 and displayed on display 28 of device 50. For instance, these screen images may be generated as the user interacts with the device 50, such as via input structures 14, or by a touch screen interface.

It should also be understood that GUI 58, depending on the inputs and selections made by a user, may display various screens including icons (e.g., 60) and graphical elements. These elements may represent graphical and virtual elements or "buttons" which may be selected by the user from display 28. Accordingly, it should be understood that the term "button," "virtual button," "graphical button," "graphical elements," or the like, as used in the following description of screen images below, is meant to refer to the graphical representations of buttons or icons represented by the graphical elements provided on display 28. Further, it should also be understood that the functionalities set forth and described in the subsequent figures may be achieved using a wide variety graphical elements and visual schemes. Therefore, the illustrated embodiments are not intended to be limited to the precise user interface conventions depicted herein. Rather, additional embodiments may include a wide variety of user interface styles.

As initially shown in FIG. 5, beginning from home screen 54 of GUI 58, the user may initiate the media player application by selecting graphical button 62. By way of example, media player application 62 may be an iPod® application running on a model of an iPod Touch® or an iPhone®, available from Apple Inc. Upon selection of graphical button 62, the user may be navigated to home screen 110 of media player application 62. As shown in FIG. 5, screen 110 may initially display listing 112 showing various playlists 114 stored on device 10. Screen 110 also includes graphical buttons 116, 118, 120, 122, and 124, each of which may correspond to specific functions. For example, if the user navigates away from screen 110, the selection of graphical button 116 may return the user to screen 110 and display playlists 114. Graphical button 118 may organize the media files stored on device 50 and display the media files in groupings based upon artist names, whereas graphical button 120 may represent a function by which media files are sorted and displayed alphabetically in a listing that may be navigated by the user. Additionally, graphical button 122 may present the user with a listing of video files available for playback on device 50. Finally, graphical button 122 may provide the user with a listing of additional options that the user may configure to further customize the functionality of device 50 and/or media player application 62.

As shown, the selection of graphical button 122 may advance the user to screen 126, which may display a listing of video files available for playback on device 50. By way of example, video files stored on device 50 may include music videos, captured videos (e.g., using camera 74), or movies. In some embodiments, video files may be downloaded from an online digital media service, such as iTunes®. As illustrated in screen 126, video file 128 is stored on device 50 and may be played by selecting graphical button 130. For instance, upon selection of graphical button 130, video file 128 may be played back on screen 132, which may sequentially display video images 134 corresponding to video file 128.

FIG. 6 shows screen images depicting the live capture of image data using camera 74. Returning to home screen 54, a user may initiate a camera application by selecting graphical button 64. The initiation of camera application 64 may activate image sensors within camera 74 for acquisition of image data, as well as ISP 106 for processing the image data captured via the image sensors. As shown, selection of camera application icon 64 may cause screen 138 to be displayed on device 50. Screen 138 may include viewfinder 140, which may display image data captured by camera 74 in substantially real time. For instance, if the user wishes to capture an image of subject 142, the user may position device 50 in such a manner that an image of subject 142 appears in viewfinder 140. Screen 130 also includes graphical button 144, which may be selected to store the captured images shown in viewfinder 140. The stored image data, referred to here by reference number 146, may include still images, such as pictures, as well as moving images, such as video. The stored image data 146 (which may be analogous to stored image data 94 of FIG. 4), may be viewed or played back on device 50 at a later time.

FIG. 7 shows screen images depicting how a user may view images stored on device 50 using a photo browser application. For instance, beginning at home screen 54, a user may select icon 66 to run a photo browser application. By way of example, photo browser application 66 may be a version of iPhoto®, available from Apple Inc., or a mobile photo browser application, which may be found on models of the iPod® Touch or the iPhone®, also available from Apple Inc. As shown in FIG. 7, the selection of icon 66 may advance the user to home screen 150 of photo browser application 66. Screen 150 may display a listing 152 of "albums" or groupings of images stored on device 50. By selecting album 153, the user may be advanced to screen 154, on which image 146 (showing subject 142) that was previously acquired using camera application 64 (FIG. 6) is displayed. In embodiments where an album includes multiple images, the multiple images may be sequentially displayed in the form of a slideshow. Screen 154 also includes graphical button 155, which the user may select to return to listing 152 on screen 150.

Having described several techniques in FIGS. 5-7 by which image data may be acquired, viewed, or played back on device 50, FIGS. 8-17 are intended to illustrate various examples of image alteration effects that may be applied to images displayed on device 50 in response to various types of device operation events, in accordance with aspects of the present disclosure. Before continuing, it should be understood the present disclosure is not intended to be limited to the specific image alteration examples depicted in FIGS. 8-17. Rather, these examples are provided in order to provide a reader with a better understanding of the disclosed image alteration techniques, which may, in additional embodiments, utilize a number of image alteration effects not specifically discussed herein.

Figure 8:
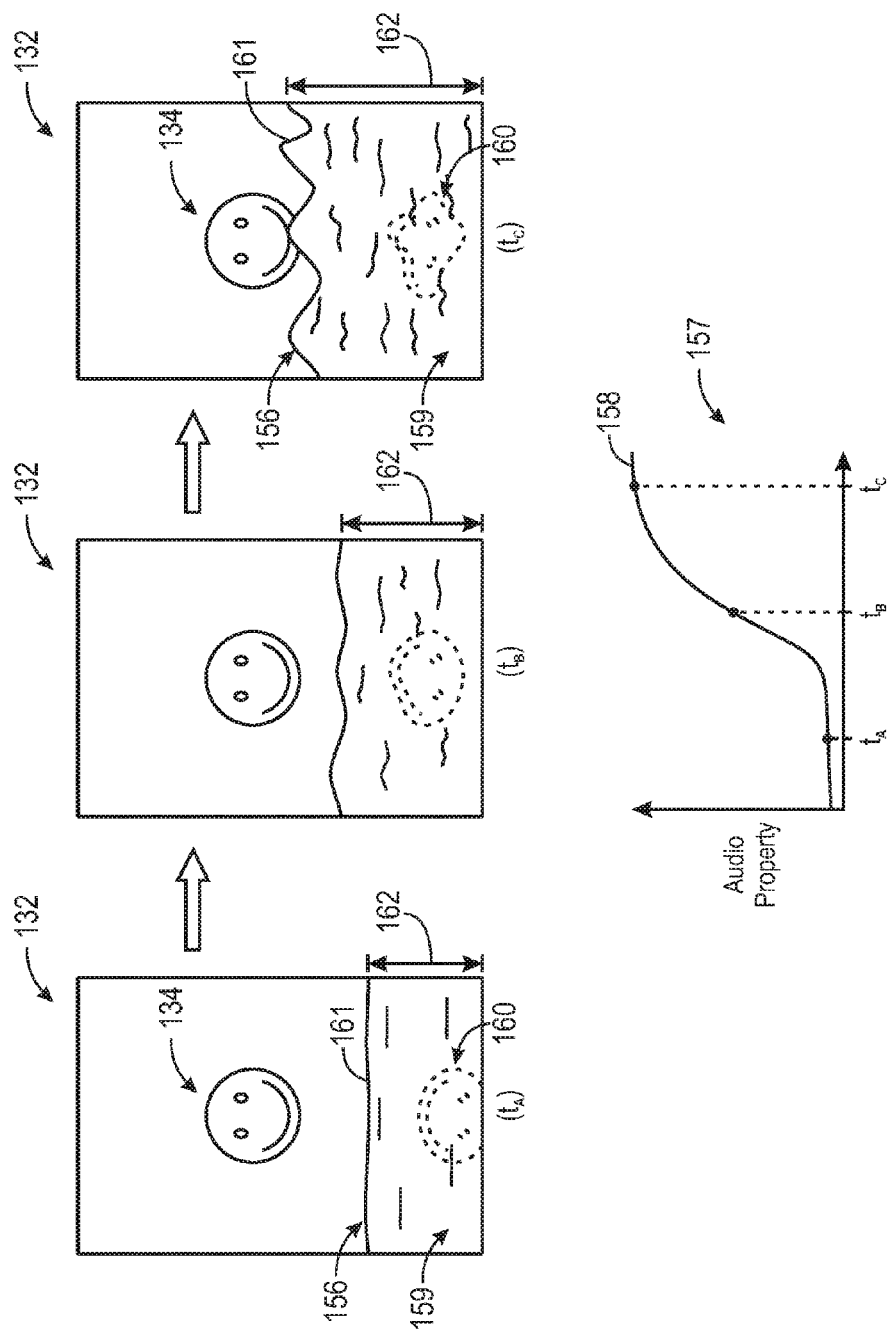
FIGS. 8-10 show several embodiments in which image data displayed on the electronic device of FIG. 2 is altered in response to one or more audio-related events, in accordance with aspects of the present disclosure.
Figure 9:
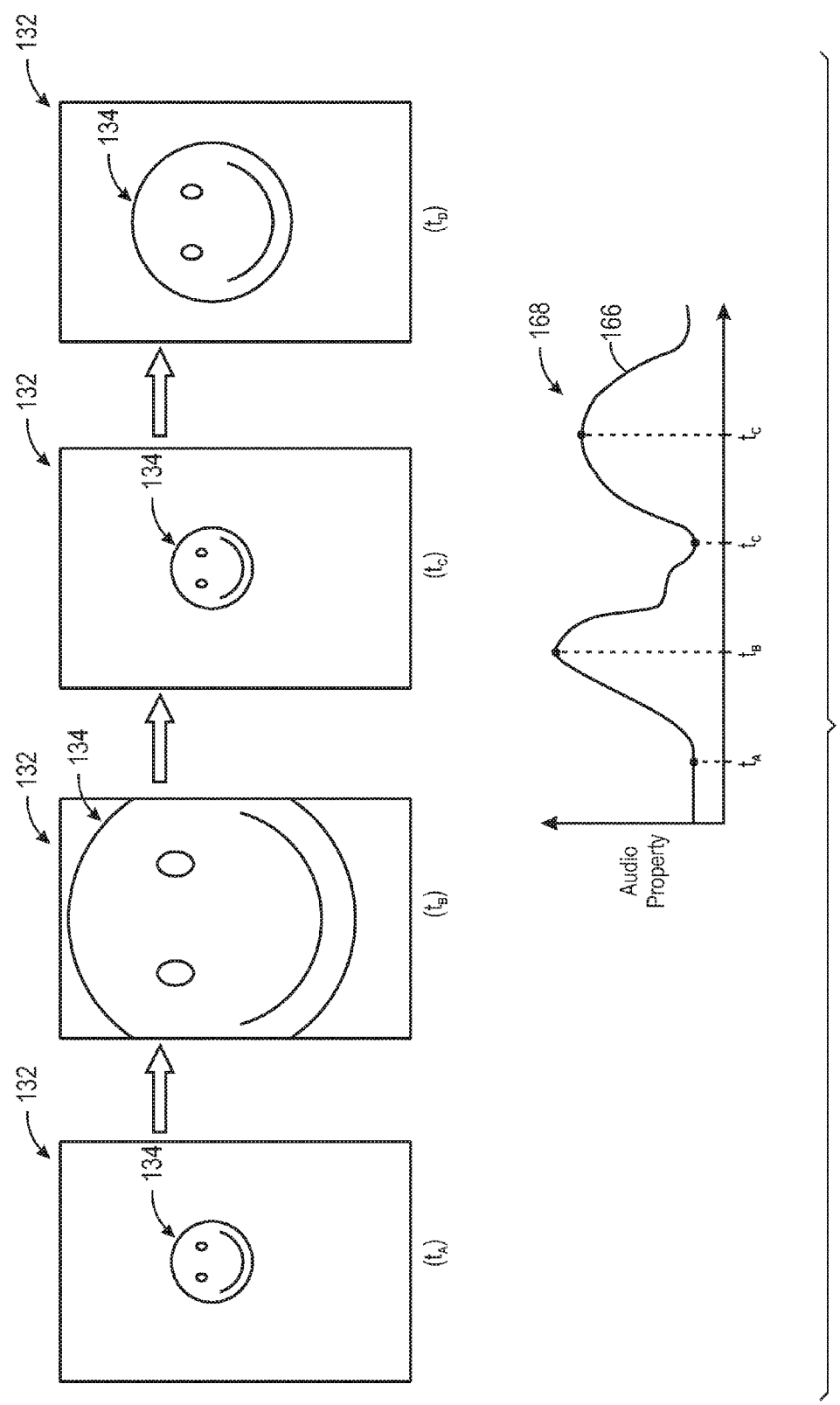
Figure 10:
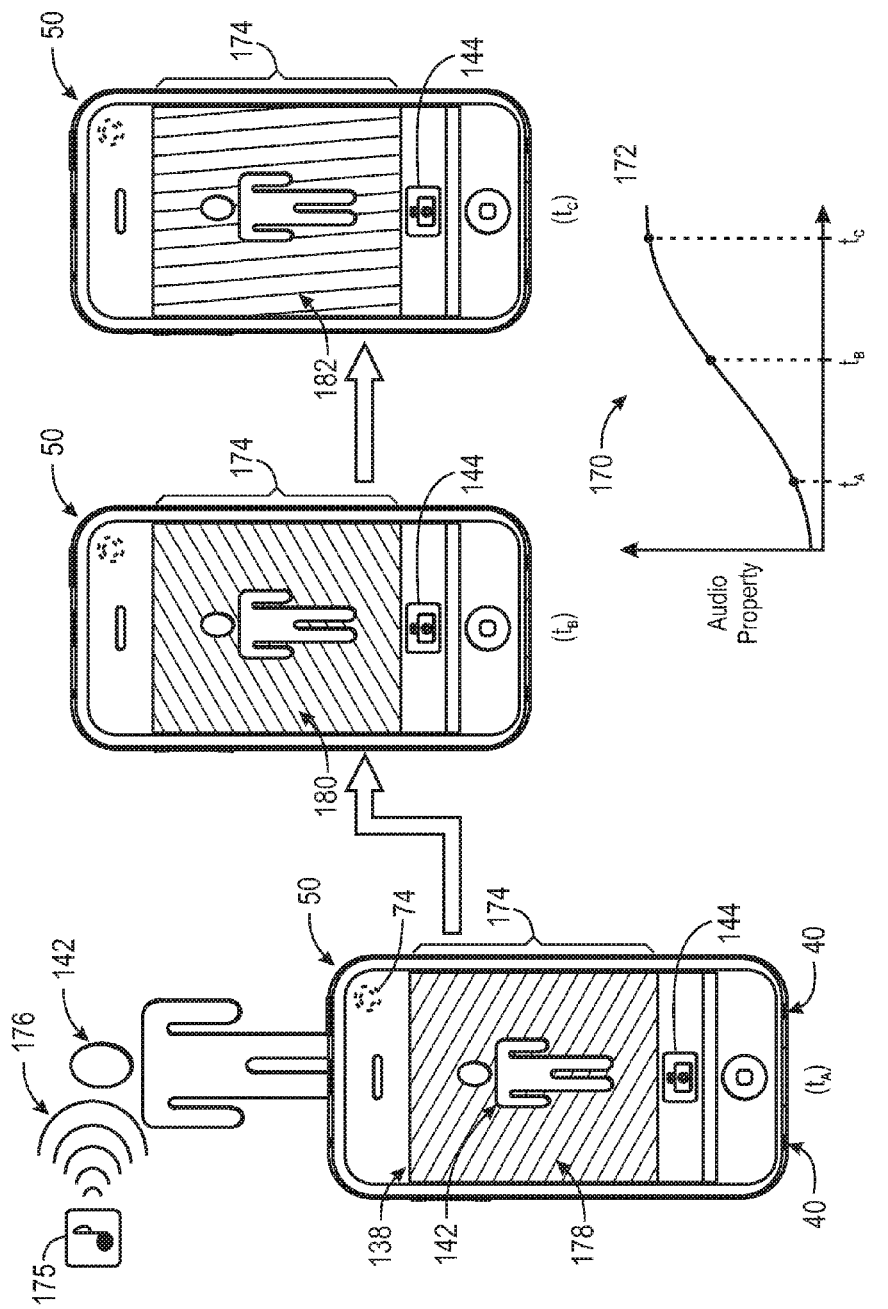

With the foregoing points in mind, FIGS. 8-10 show examples of image alteration effects that may be triggered based upon audio events. For example, referring first to FIG. 8, an example of a "water reflection" effect that may be applied to the playback of video file 128 (FIG. 5) is illustrated. As discussed above with reference to FIG. 5, video file 128 may be played back using media player application 62, in which video images 134 are displayed on screen 132. In the presently illustrated embodiment, the water reflection effect, referred to by reference number 156, may be triggered or influenced by an audio event, such as the detection of changes in a particular audio property (trace line) 157 over time, particularly at times $t_A$, $t_B$, and $t_C$, as shown on graph 158. As discussed above, audio event data may be determined by analyzing audio input data (via audio analysis logic 100) to determine one or more properties of the audio input data, such as key, tempo, beat, frequency, volume, spectral content, or RMS level properties, as well as properties based upon metadata information, such as genre or artist information. For instance, the audio data may be an audio signal (e.g., voice input) received by audio input device(s) 40, or may be audio data played back on device 50 substantially concurrently with video file 128. By way of example, where video file 128 is a music video file, the analyzed audio data may be the audio portion of the music video that is played back in synchronization with the video portion of the music video.

As shown, water reflection effect 156 may alter video image 134 by the addition (e.g., overlaying) of a water-like graphical element 159 near the bottom of screen 132, which may include a graphical water reflection 160 of video image 134 and a water surface 161. In the depicted embodiment, the height 162 and overall "turbulence" characteristic of the water graphic 159 may change in response to changes in audio property 158. For instance, as shown on graph 157, from time $t_A$ to time $t_B$, the value of audio property 158 has increased. By way of example, the increase in audio property 158 could correspond to an increase in volume, tempo, frequency level, spectral content, or any suitable type of audio property that may be used to trigger image alteration. As such, screen 132 may also change from time $t_A$ to time $t_B$ in response to the change in audio property 158. For instance, as shown in FIG. 8, due to the increase in audio property 158, both the height 162 and turbulence of water graphic 159 may increase. For instance, as shown on screen 132 at time $t_B$, the increased turbulence (which may be displayed as "ripples") in water graphic 159 may cause reflection 160 to become slightly distorted and the surface 161 of water graphic 159 to become more wave-like in appearance. As further indicated by graph 157, audio property 158 continues to increase from time $t_B$ to time $t_C$. Accordingly, as shown by screen 132 at time $t_C$, the height 162 and turbulence of the water graphic 159 may continue to increase, which may cause reflection 160 to become even more distorted and surface 161 to become more wave-like, when compared to screen 132 at time $t_B$.

Continuing to FIG. 9, another example of an image alteration effect that responds to changes in a particular audio property is shown. The image alteration effect shown in FIG. 9 may be a "zooming" effect, in which the depth of the displayed image, which may be video images 134 (corresponding to video file 128) displayed by screen 132, changes based on corresponding changes in audio property 166, as illustrated by graph 168. By way of example only, audio property 166 may indicate the level of a particular frequency range, such as a low frequency level (e.g., bass content), that is present in the audio data being analyzed by audio processing logic 100.

The zooming effect may, thus, be applied such that the depth of a displayed image decreases as the bass content in the audio data increases. For instance, referring to screen 132 at time $t_A$, video image 134 may be displayed at a first depth based upon the value of bass content 166 at time $t_A$. Subsequently, at time $t_B$, the bass content 166 has significantly increased. As such, screen 132 at time $t_B$ may display video image 134 at a lesser depth, thus creating the visual appearance that video image 134 is "zoomed in." Thereafter, at time $t_C$, the bass content level may decrease and return to approximately the same level from previous time $t_A$. Thus, as shown by screen 132 at time $t_C$, the depth of video image 134 may increase ("zoom out") to approximately the same depth that was used in displayed video image 134 at time $t_A$. Finally, at time $t_D$, the bass content level 166 may increase again, thereby decreasing the depth at which screen 132 displays video image 134 at time $t_D$, essentially creating the visual effect that video image 134 is "zoomed in" at time $t_D$, although to a lesser extent than at time $t_B$ due to the difference between the bass content levels at times $t_B$ and $t_D$.

FIG. 10 illustrates an embodiment in which audio events may influence image alteration effects applied to the live acquisition of image data by camera 74 of device 50. In FIG. 10, the applied image alteration effect may be a color filtering effect, such that the background of the acquired live image data 174 changes in response to a particular audio property 172, as shown by graph 170. In other embodiments, color filtering effects may also at least partially alter the foreground of a displayed image. In the present embodiment, audio property 172 may indicate frequency information derived using frequency and/or spectral analysis of an external audio signal 176 (provided by external audio source 175), which may be received by device 50 using audio input devices 40 and processed by audio processing logic 100 (FIG. 4). By way of example, audio property 172 may provide an indication as to what type of frequency content is most abundant at a particular time (e.g., times $t_A$, $t_B$, and $t_C$). For instance, analysis of audio signal 176 may indicate that the majority of audio signal 176 is concentrated in the low frequency ranges (bass) at time $t_A$, in the mid-frequency ranges (mid) at time $t_B$, and in the high frequency ranges (treble) at time $t_C$. Based upon this analysis, different color filtering effects may be applied to live image data 174 at times $t_A$, $t_B$, and $t_C$.

For example, referring to device 50 at time $t_A$, a first color filter effect 178 may be applied to live image 174 displayed on screen 138 (which may be part of camera application 64) based on the relatively high bass content in audio signal 176 at time $t_A$. By way of example, color filter effect 178 may be a single color effect, such as a sepia or a black-and-white color filter, or may include two or more colors that may transition or "pulse" in an alternating manner (e.g., transition from blue to green, back to blue, and so forth). Next, at time $t_B$, graph 170 indicates that audio signal 176 has relatively high mid-range levels, thereby causing color filter effect 180 to be applied to live image data 174 at time $t_B$. Finally, at time $t_C$, graph 170 indicates that audio signal 176 has relatively high treble content, thereby causing color filter effect 182 to be applied to live image data 174 at time $t_C$. Thus, the background appearance of live image 174 of subject 142, as displayed on screen 138 of device 50, may continue to change in response to corresponding changes in audio property 172. Further, as described above with respect to FIG. 6, the live image 174 may be stored onto device 50, either as a still picture or a video, via selection of graphical button 144.

Before continuing, it should be understood that the audio events used to trigger the image alteration effects described in FIGS. 8-10 are provided merely by way of example. In an actual implementation, any suitable type of audio event (e.g., keys, tempo, beat, frequency, volume, spectral content, or RMS level properties, metadata information, etc.) could be configured to trigger a number of different image alteration effects. For instance, such image alteration rules may be configured by a user via set of user preferences (e.g. 92) stored on device 50, as will be discussed further below.

Next, FIGS. 11-14 show examples of image alteration effects that may be triggered based upon motion events. For instance, such motion events may be provided by motion data sensed by motion sensing device 36, which may include an accelerometer and/or gyroscope, configured to sense or measure various types of motion, such as velocity, acceleration, rotation, and direction, all of which may be configured to trigger one or more image alteration effects.

Figure 11:
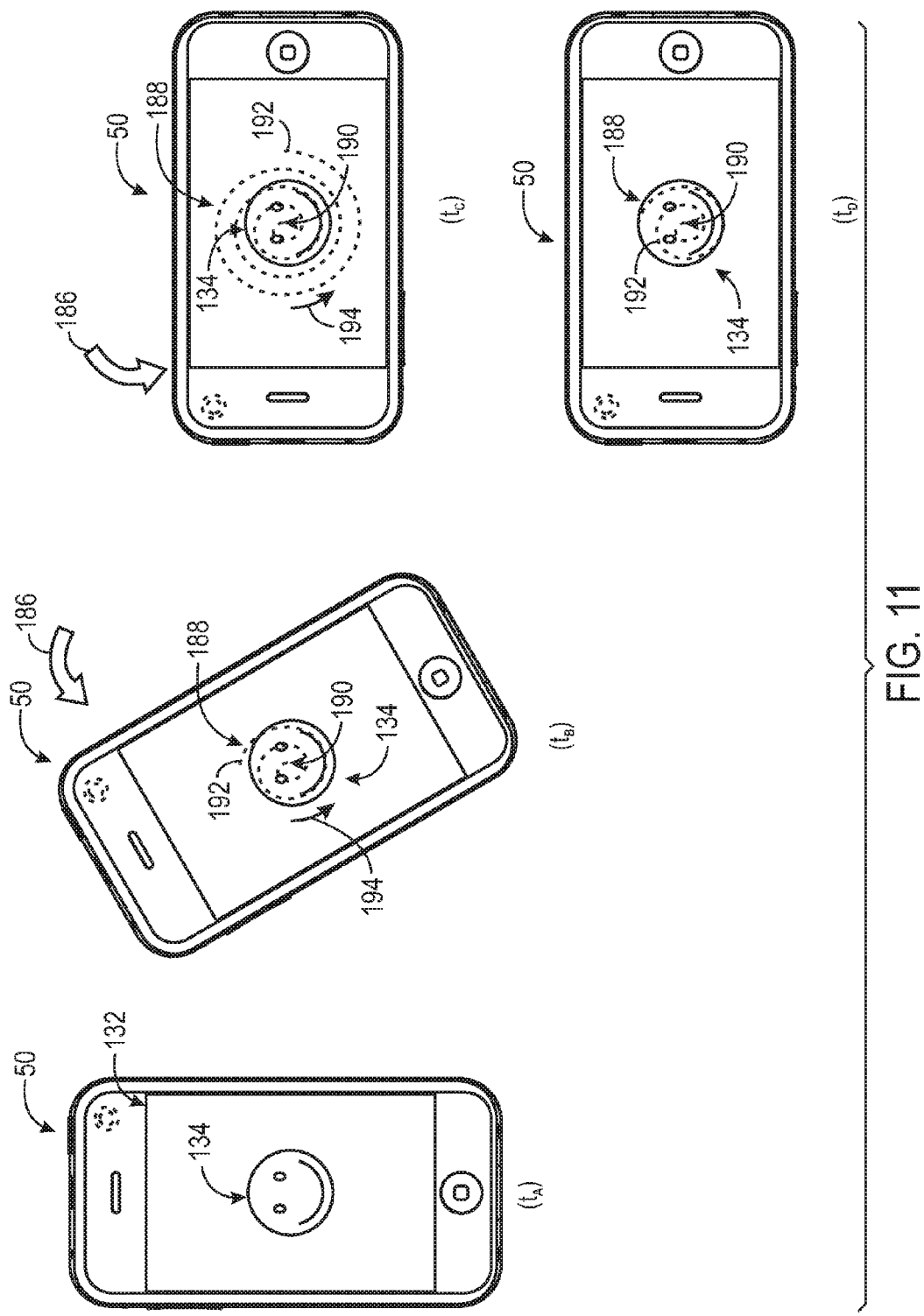
FIGS. 11-14 show several embodiments in which image data displayed on the electronic device of FIG. 2 is altered in response to one or more motion-related events, in accordance with aspects of the present disclosure.

Referring to FIG. 11, an example of an image alteration effect that is triggered by rotational motion of device 50 is shown at three different points in time: $t_A$, $t_B$, and $t_C$. Initially, device 50 may be in a first position at time $t_A$. As shown at time $t_A$, device 50 is in the process of playing back video file 128 and may display video image 134 using screen 132 of media player application 62, as previously described in FIG. 5. Between times $t_A$ and $t_B$, device 50 experiences a rotational motion 186 in the counter-clockwise direction, and is eventually moved into a second position, as shown at time $t_B$.

Based on rotation 186, image processing logic 30 may apply a spiral effect, referred to by reference number 188, to video image 134. For instance, spiral effect 188 may include curve 192 that emanates from the center 190 of screen 132 in direction 194. Direction 194 may be the same direction as the direction of rotation 186, i.e., counter-clockwise, as shown in the presently illustrated embodiment, or may be opposite the direction of rotation 186, i.e., clockwise. Additionally, image processing logic 30 may also alter video image 134 based upon rotation 186, such that the orientation of video image 134 remains generally constant from the viewpoint of a user viewing screen 132, even though device 50 has changed positions. In other words, despite the movement experienced by device 50, video image 134 appears to remain stationary. Also, it should be noted that the present embodiment shows that image alteration may be triggered by any degree of rotation, i.e., triggered by "continuous" rotation. In other embodiments, a triggering rotation event may be defined such that image alteration is not triggered until at least a certain degree of rotation, such as 90 or 180 degrees, is detected.

In some embodiments where image alteration is triggered by continuous rotation, the "intensity" of the image alteration effect may increase and decrease in proportion to the amount of rotational motion experienced by device 50. That is, some aspect of the image alteration effect may increase or be applied more vigorously as rotation continues, and may decrease or be applied less vigorously when rotation decrease or stops. For instance, as shown in FIG. 11, device 50 may continue to experience rotation 186 times $t_B$ and $t_C$, eventually reaching a third position at time $t_C$. Based upon this continued rotational motion 186, the "intensity" of spiral effect 188 may increase, such that curve 192 emanates even further outward from center 190 of screen 132 at time $t_C$. Next, from times $t_C$ to $t_D$, device 50 may experience little or no motion, thus retaining approximately the same position from times $t_C$ to $t_D$. As shown, because rotational motion was not detected during between times $t_C$ and $t_D$, the "intensity" of spiral effect 188 may decrease and curve 192 may retract back towards center 190 of screen 132. Further, although not specifically shown in FIG. 11, it should be understood that additional factors, such as the velocity of rotational motion 186, could also contribute to an increase or decrease in the intensity of an applied image alteration effect.

Figure 12:
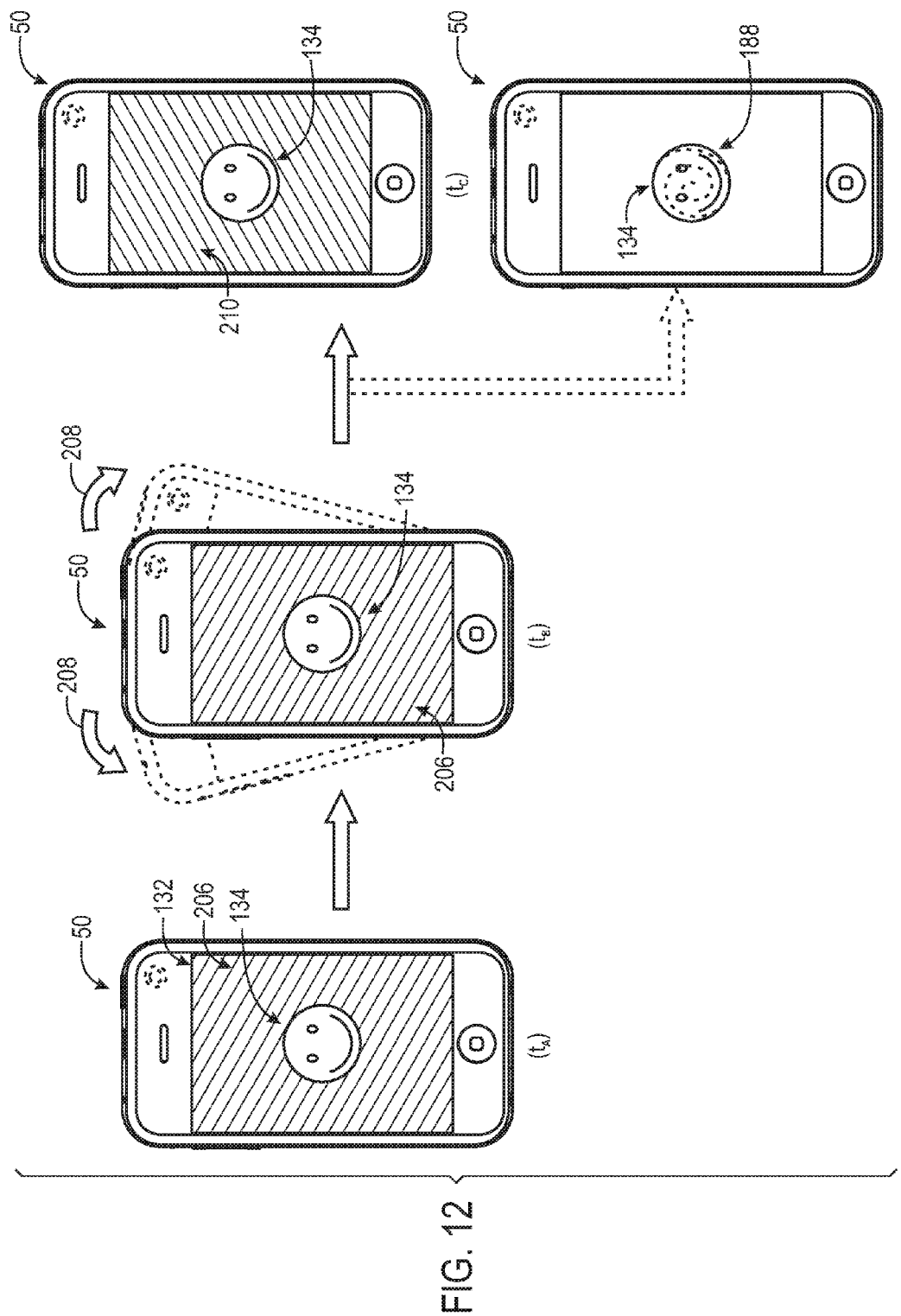

As discussed above, in addition to rotation, other types of motion may also be detected by motion sensing device 36. For example, FIG. 12 illustrates how image alteration may be triggered by a "shaking" motion. Referring to device 50, a shaking motion may be generally defined as a repeated back and forth motion of device 50 over a relatively short interval. For example, as shown in FIG. 12, device 50 is initially stationary at time $t_A$ and may be displaying video image 134 (e.g., playing back video file 128 in media player application 62) with a color filter effect 206 applied. At time $t_B$, device 50 experiences a shaking motion, as shown by motion arrows 208. In response to the detection of shaking motion 208, image processing logic 30 may alter the displayed video image 134 by applying a different color effect filter 210, as shown at time $t_C$. Thus, shaking motion 208 may cause video image 134 to transition from having a first background color at time $t_A$ to a second background color at time $t_C$.

In further embodiments, shaking motion 208 may cause a random image alteration effect to be applied. For instance, upon detection of shaking motion 208, image processing logic 30 may randomly select and apply an image alteration effect. For instance, as further illustrated in FIG. 12, instead of simply varying a color filter effect (changing color filter effect 206 to color filter effect 210) in response to shaking motion 208, image processing logic 30 may apply a completely different type of image alteration effect at time $t_C$, such as the spiral effect 188 discussed above in FIG. 11. As will be appreciated, the current image alteration effect may continue to be displayed until subsequent shake events are detected. For instance, additional shake events may cause spiral effect 188 to transition to a water reflection effect 156 (FIG. 8) or a zooming effect (FIG. 9).

Figure 13:
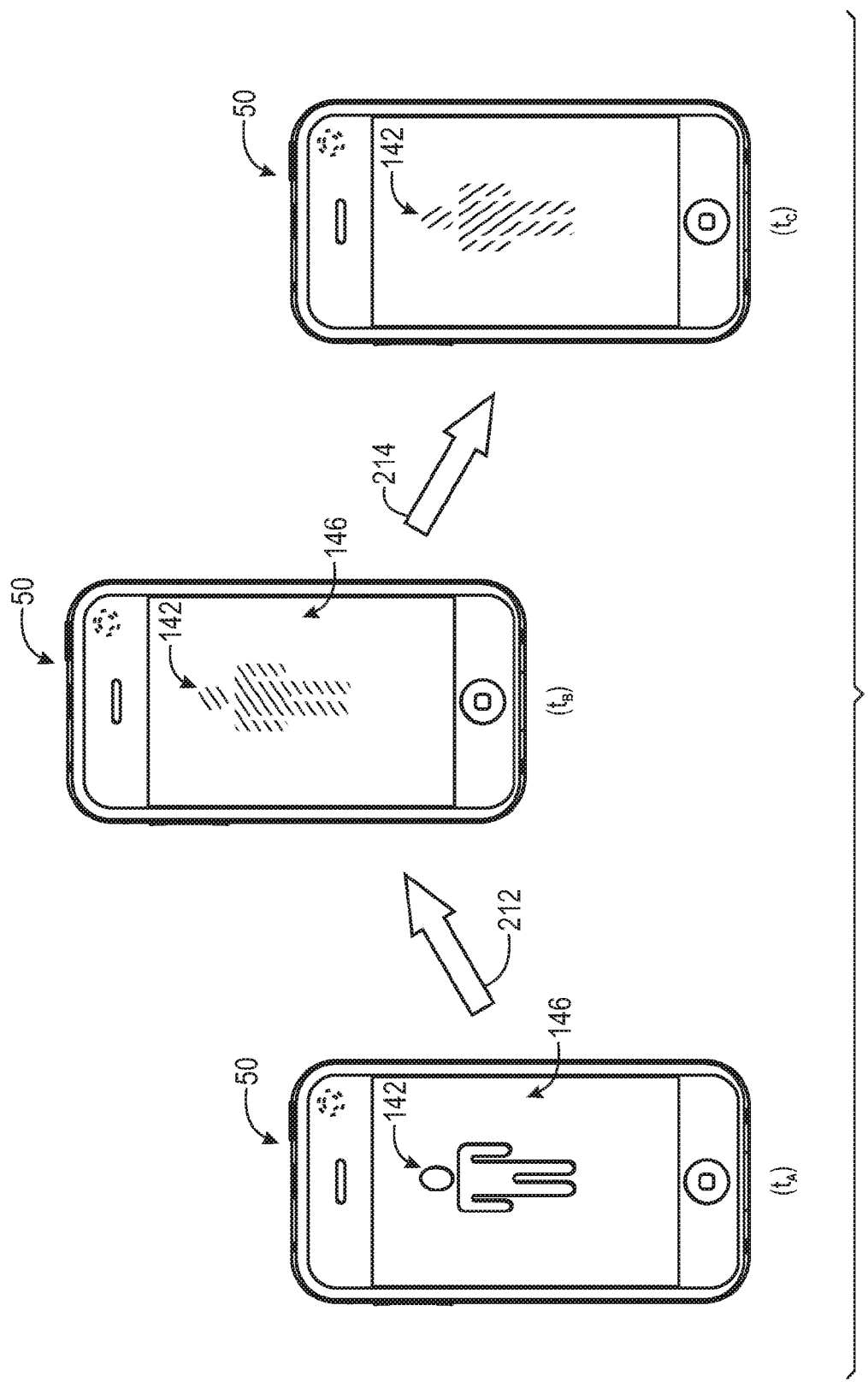

Continuing to FIG. 13, a "brush-stroke" effect that may be triggered by motion of device 50 is illustrated, in accordance with aspects of the present disclosure. The brush-stroke effect may cause an image displayed on device 50 to be altered, such that the image appears as a plurality of "brush-like" strokes, wherein the direction of the strokes may be determined based on the direction of motion that device 50 experiences. For example, at time $t_A$, device 50 is generally stationary and may display image 146 of subject 142 (e.g., using photo browser application 66). From time $t_A$ to time $t_B$, device 50 may experience linear motion in the direction indicated by arrow 212. Thus, at time $t_B$, a brush-stroke effect may be applied to image 146, such that subject 142 appears as a plurality of brush-like strokes, each stroke generally being oriented in direction 212. Next, from time $t_B$ to time $t_C$, device 50 experiences linear motion in the direction indicated by arrow 214. As such, image 146 is further altered at time $t_C$, such that the direction of the brush-strokes (representing subject 142) are re-oriented in direction 214. In some embodiments, the length, thickness, color, or distribution of the brush-strokes may be at least partially influenced by the velocity at which device 50 is moved and/or the amount of time over which the motion (e.g., 212 or 214) occurs.

Figure 14:
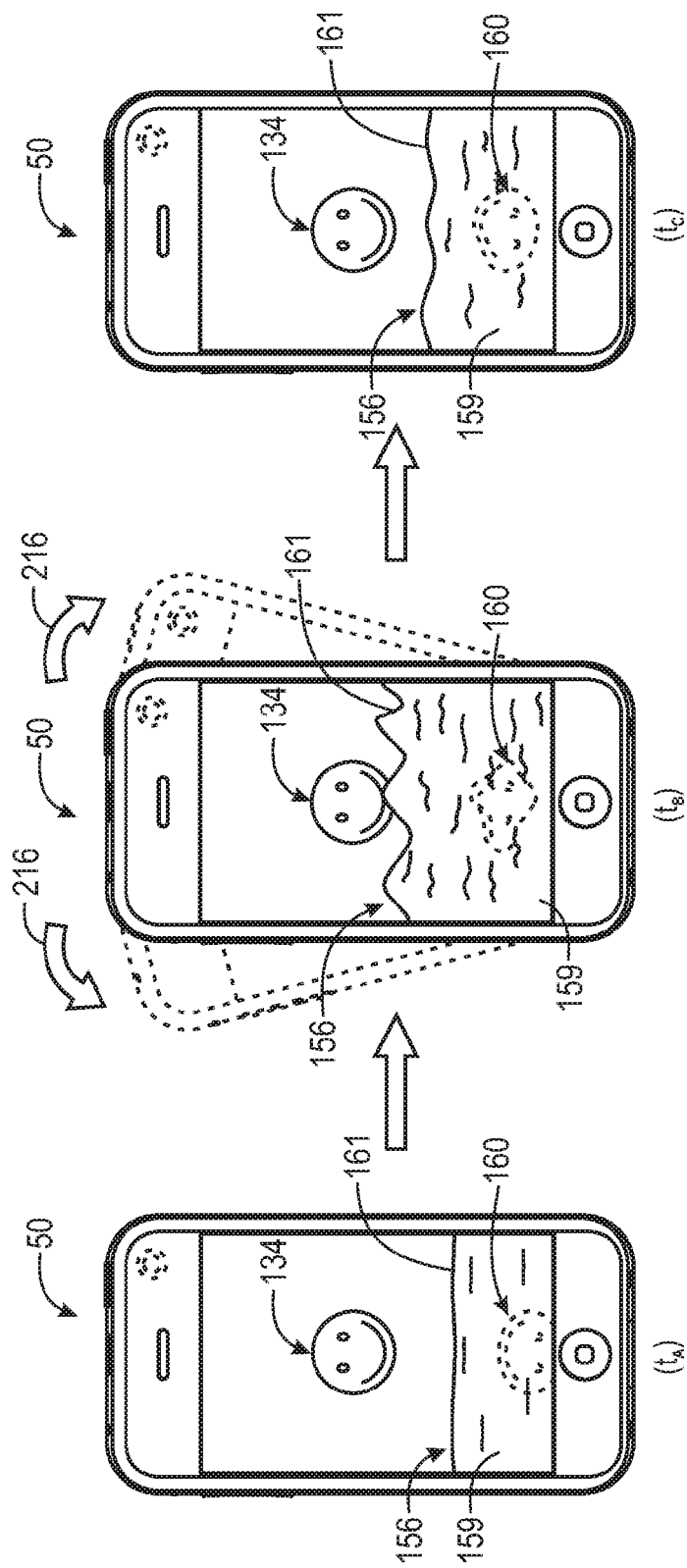

As can be appreciated, the various image alteration examples described herein are not intended to be limited to one specific triggering event. That is, a user may have the option of configuring image alteration effects to be triggered by different device operation events, or by a combination of multiple device operation events. For example, referring to FIG. 14, water reflection effect 156, which was previously described in FIG. 8 as being triggered by audio property 158, is shown as being triggered by a shake event. Beginning at time $t_A$, device 50 may display video image 134 with water reflection effect 156 applied thereto. Since device 50 is generally stationary at time $t_A$, water graphic 159, which may include reflection 160, may exhibit little to no turbulence. At time $t_B$, device 50 may experience a shaking motion, as illustrated by arrows 216. In response to shaking motion 216, the turbulence in water graphic 159 may increase, thus increasing the amount of "ripples" and causing reflection 160 to become distorted. Additionally, shaking motion 216 may also increase the waviness of water surface 161. As the shaking motion 216 ends and device 50 becomes stationary once again, the turbulence in water graphic 159 may begin to subside, as shown at time $t_C$. As can be appreciated, the behavior of water reflection effect 156 shown in FIG. 14 is similar to the behavior shown in FIG. 8 (with the exception of a height increase, i.e., 162,), except that the present embodiment utilizes a motion event as a triggering event rather than an audio event.

In a further embodiment, water reflection effect 156 may be responsive to both audio and motion events. For example, referring now to FIG. 15, water reflection effect 156 may be responsive to both audio property 158 (graph 157), as discussed above in FIG. 8, and to a rotational motion of device 50. At time $t_A$, device 50 is generally stationary and the value of audio property 158 is relatively low. As such, water graphic 159 and reflection 160 may exhibit little to no turbulence. At time $t_B$, device 50 experiences a rotational motion 220 in the clockwise direction, and the value of audio property 158 increases from its value at time $t_A$, both of which may cause changes in water reflection effect 156. For instance, in response to rotation 220, water graphic 159 may shift towards the bottom-most region of display 28 based on the position of device 50 at time $t_B$. As can be appreciated, this effect may be similar to tilting a glass partially filled with a liquid. Further, in response to the change in audio property 158, the height 162 of water graphic 159 may rise, and water reflection effect 156 may display increased turbulence, as shown by the increase of ripples in water graphic 159 and the increased waviness of water surface 161. Additionally, as shown at time $t_B$, device 50 may be configured in a manner similar to FIG. 11, wherein the orientation of video image 134 appears to remain stationary (from the viewpoint of a user) despite a rotational change in the orientation of device 50.

Next, from time $t_B$ to time $t_C$, device 50 continues to experience rotation 220 and the value of audio property 158 continues to increase, as shown in graph 157. As a result, water graphic 159 may continue shift towards the bottom-most region of display 28, as shown at time $t_C$. Also, in response to the change in audio property 158 at time $t_C$, the height 162 and turbulence characteristics of water graphic 159 may continue to increase. For instance, water surface 161 may become even more wave-like in appearance, and water graphic 159 may become even more rippled in appearance, thus further distorting reflection 160.

Figure 15:
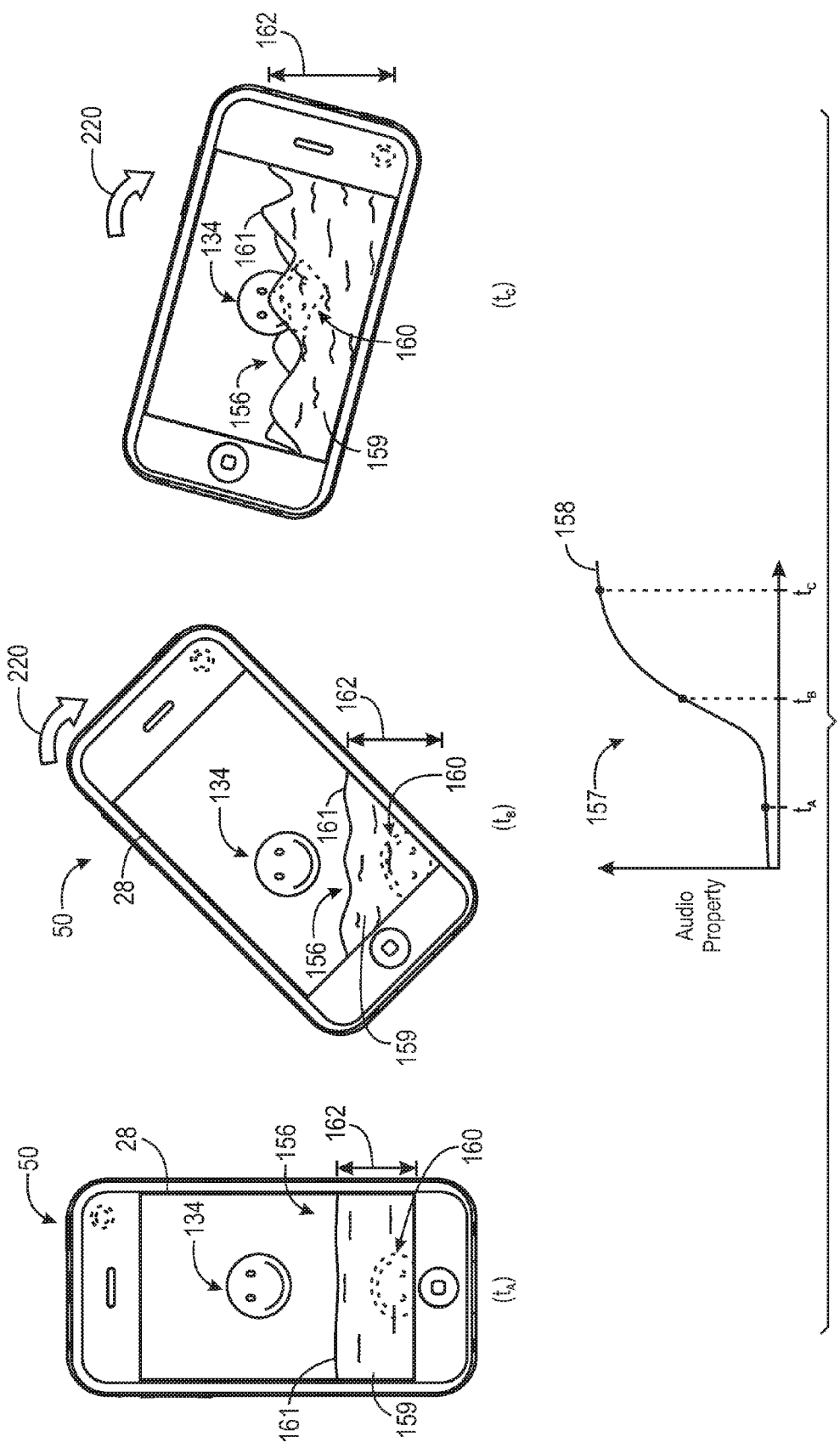
FIG. 15 shows an embodiment in which an image alteration effect that is applied to image data displayed on the electronic device of FIG. 2 is responsive to both audio-related and motion-related events, in accordance with aspects of the present disclosure.

While embodiment shown in FIG. 15 illustrates a combination of motion and audio events for implementing image alteration, it should be appreciated that other embodiments may employ different combinations, such as audio and location events, audio and image capture events, motion and location events, and so forth. Still further, some embodiments may define triggering events as a combination of more than two types of device operation events (e.g., a combination of motion, audio, and location events), or as a combination of two different aspects of a particular type of device operation event, such as combining a rotational motion with a shaking motion.

Figure 16:
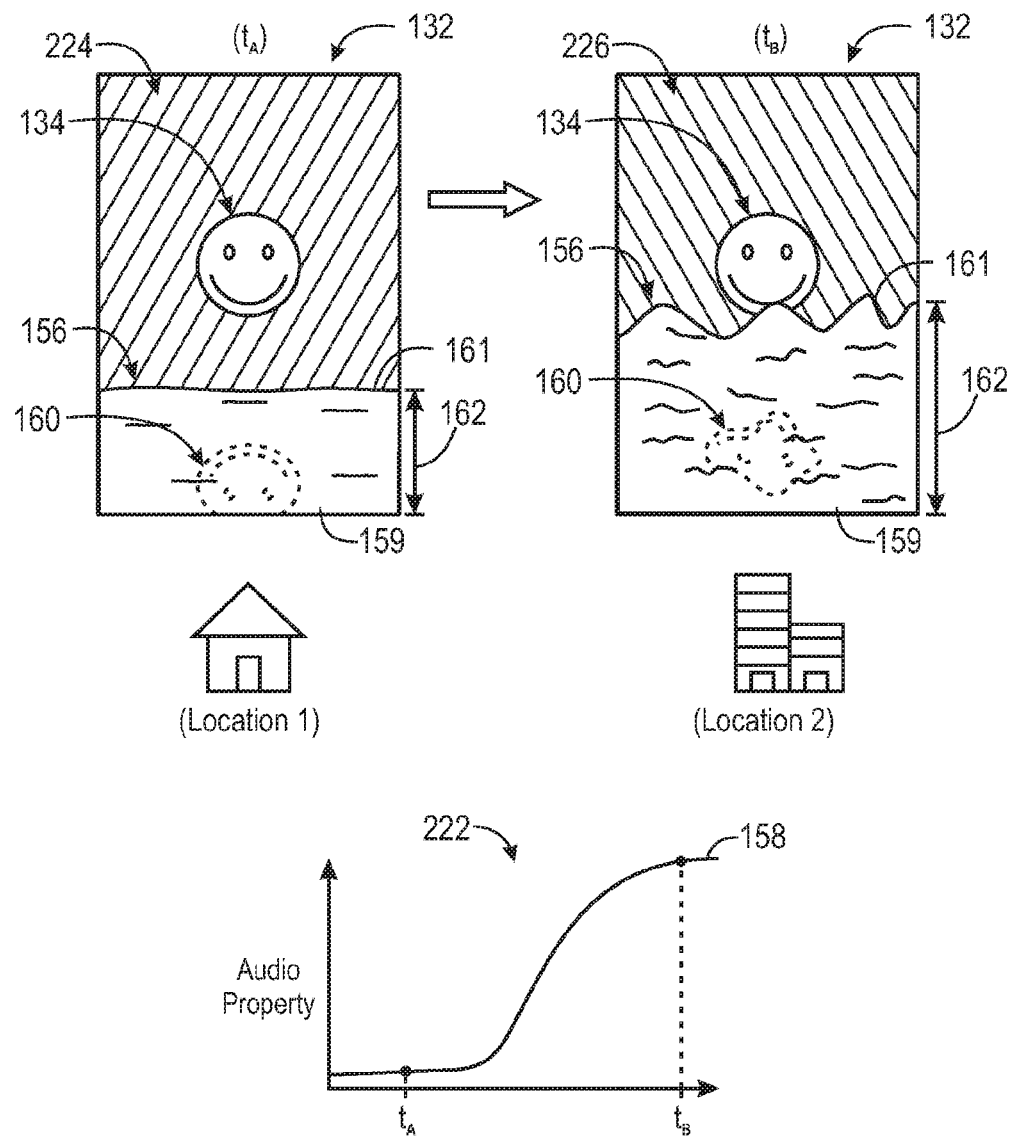
FIG. 16 shows an embodiment in which image data displayed on the electronic device of FIG. 2 is altered based upon both audio-related events and location-related events, in accordance with aspects of the present disclosure.

To provide another example, FIG. 16 illustrates one embodiment in which image alteration is based upon audio and location events. For instance, the audio event may be based upon the above-discussed audio property 158 at two times, $t_A$ and $t_B$, as shown in graph 222. The location event may be determined via positioning device 38, which may be a GPS device, for example. In one embodiment, the user may define one or more geographic coordinates as being contributing trigger events for image alteration. By way of example, a geographic coordinate could correspond to a user's home, place of work, favorite restaurant, and so forth.

In the illustrated embodiment, device 50 may display video image 134 with water reflection effect 156 applied thereto, which may respond to changes in audio property 158 in manner similar to the embodiment shown above in FIG. 8.

Location events may trigger a color filter effect, which may be applied concurrently with water reflection effect 156. Beginning at time $t_A$, device 50 may be at "LOCATION 1," which may be geographic coordinates corresponding to the user's home, and audio property 158 may have a relatively low value. As such, water graphic 159 and reflection 160 may exhibit little to no turbulence. Additionally, due the geographic position of device 50 at LOCATION 1, color filter effect 224 may also be applied to video image 134. As discussed above, color filter effects may at least partially alter the background and/or foreground of a displayed image. By way of example, color filter effect 224 may be alter the color of the background of video image 134, such as by applying a red, green, blue, yellow, purple, or other color. Additionally, color filter effect 224 may also alter the tone of video image 134, such as by applying a sepia tone, grayscale tone, black and white tone, etc.

Next, at time $t_B$, the value of audio property 158 may increase, and the geographic position of device 50 may change to LOCATION 2, which may be geographic coordinates corresponding to a user's place of employment, such as a law firm or a computer company. Based on the increase in audio property 158, water reflection effect 156 may exhibit increased turbulence characteristics, as discussed above. Further, the change in geographic location from LOCATION 1 to LOCATION 2 may trigger a change in the color filter effect applied, such that color filter effect 224 at time $t_A$ transitions to color filter effect 226 at time $t_B$.

Continuing now to FIG. 17, an example of an image alteration technique that may be triggered based upon image capture events is shown, in accordance with a further embodiment. The image capture event may be based on an imaging property 230, as determined by image signal processor (ISP) 106. For instance, referring to graph 232, imaging property 230 may change from time $t_A$ to $t_B$ and trigger image alteration. By way of example, imaging property 230 may be a brightness level, lighting condition, exposure value, sharpness, or any other type of imaging property that may be assessed by ISP 106.

As shown at time $t_A$, device 50 may be in the process of capturing live image data 174 of subject 142. As discussed above in FIG. 6, the capture of live image data 174 may be performed using camera 74 in conjunction with camera application 64. Particularly, the user may position device 50, such that subject 142 appears in viewfinder 140. Graphical button 144 may be selected to store live image data 174 to device 50 (e.g., in storage device 20). In the present embodiment, an image alteration effect may be triggered once imaging property 230 drops below a particular threshold, represented in graph 232 by reference number 234. Thus, because imaging property 234 is above threshold 234 at time $t_A$, no image alteration effect is applied at time $t_A$.

Thereafter, at time $t_B$, image property 230 may drop below threshold 234, thus triggering image alteration of the displayed live image data 174. For example, the drop in value of image property 230 may be attributed to a change in a lighting condition, a brightness level, exposure value, and so forth. Accordingly, at time $t_B$, image alteration effect 236 may be applied to live image data 174. By way of example, image alteration effect 236 may be a color filter effect, as discussed above, or may be an x-ray effect, a thermal camera effect, a night-vision camera effect, or any other type of image alteration effect.

As will be appreciated, the various embodiments described above are provided merely by way of example, and are not intended to limit the presently disclosed image alteration techniques an in way. Rather, it should be appreciated that various types of image alteration effects may be triggered in response to one or more device operation events. As mentioned above, such relationships may be defined by a user as "image alteration rules" in a set of user preferences 92 on electronic device 10.

Figure 18:
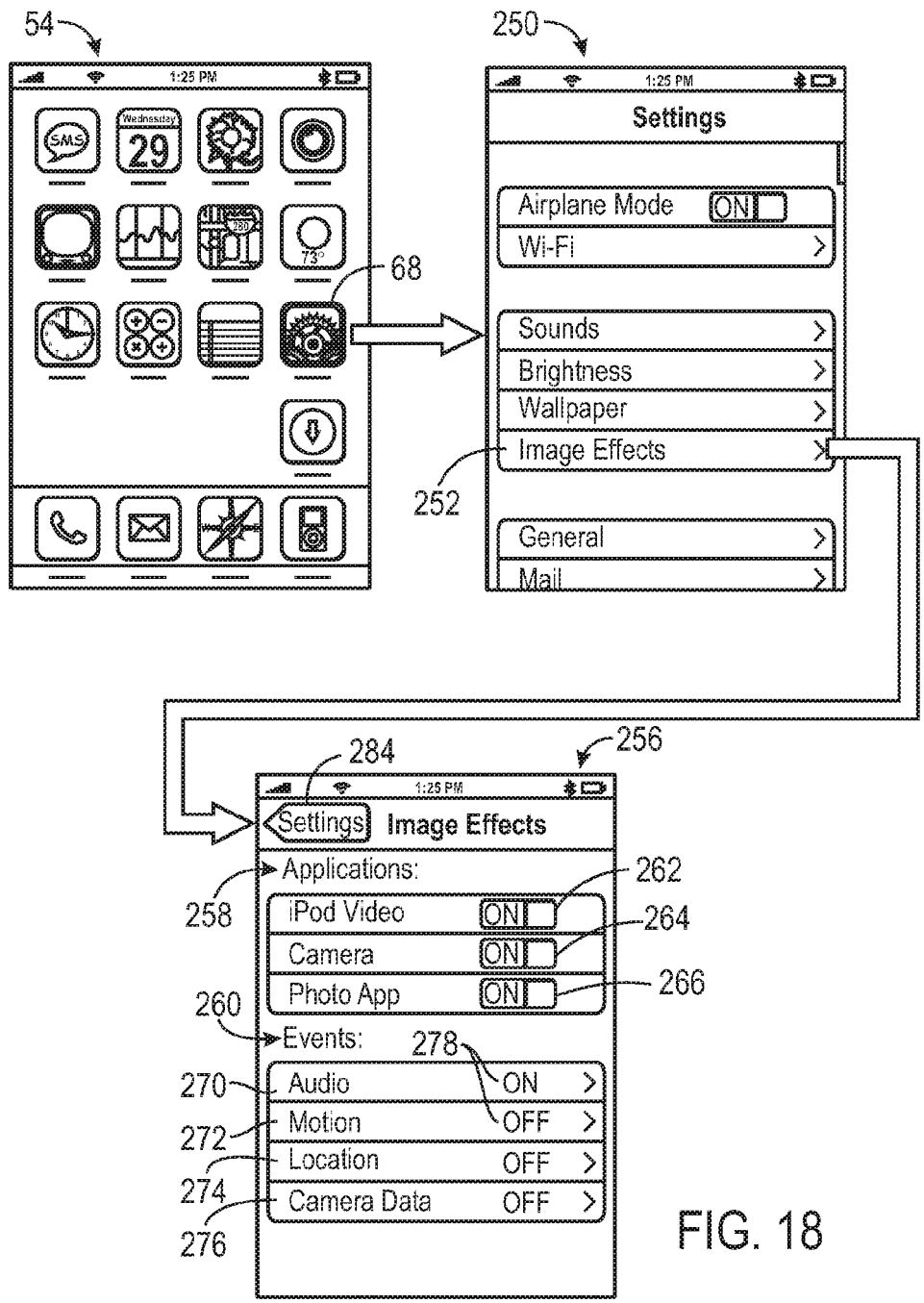
FIGS. 18-20 show a plurality of screens that may be displayed on the electronic device of FIG. 2 showing the configuration of various image alteration settings, in accordance with aspects of the present disclosure.
Figure 19:
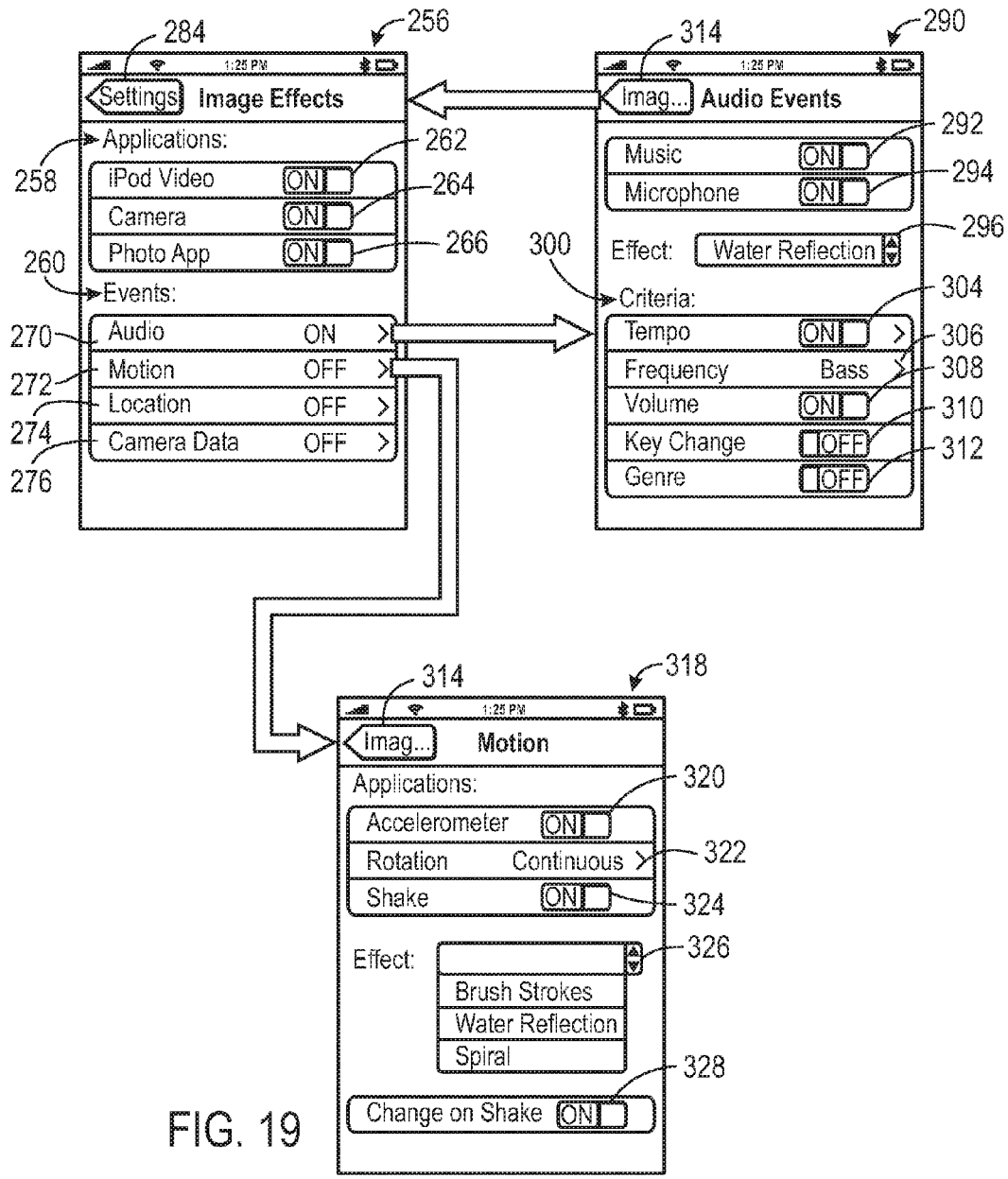
Figure 20:
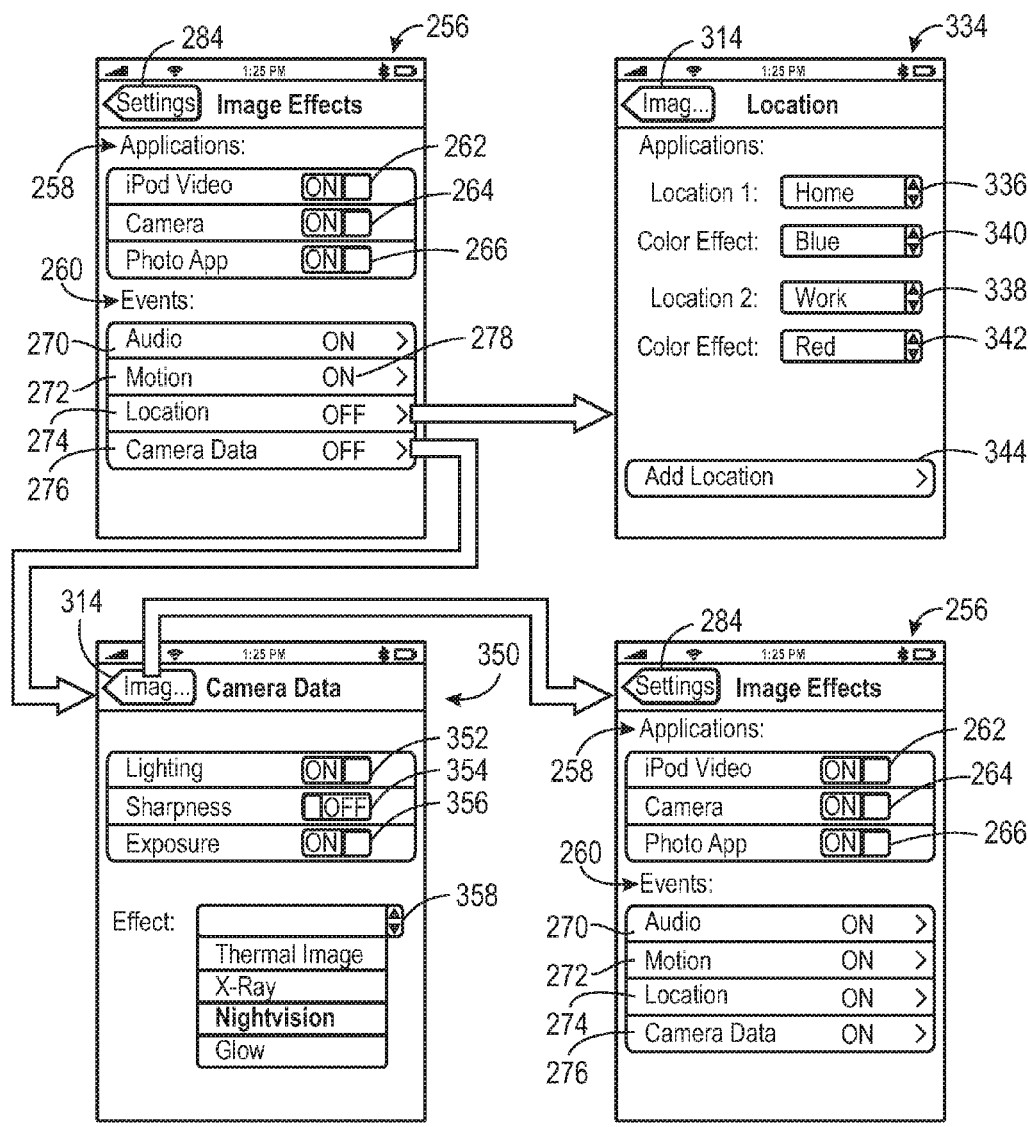

Continuing now to FIGS. 18-20, a plurality of screen images that may be displayed on handheld device 50 illustrating techniques for configuring user preferences 92 are illustrated, in accordance with aspects of the present disclosure. These screen images may be displayed as part of GUI 58. Referring first to FIG. 18, a user may navigate from home screen 54 to screen 250 via selection of icon 68. Screen 250 may display a listing of various user preference settings that may be configured by the user such that device 50 operates in a desired manner. For instance, screen 250 may provide the user access to various network settings, sound settings, display brightness settings, as well as image alteration settings, shown here by graphical menu button 252. By selecting graphical menu button 252, the user may access screen 256 for configuration of various image alteration settings.

As shown in screen 256, the user may configure application settings 258, as well as device operation events 260. For example, by toggling graphical switches 262, 264, and 266, the user may specify whether image alteration effects are to be applied during: playback of video data using media player application 62 (switch 262); during capture of live image data (switch 264); or during the viewing of stored images using photo browser application 66 (switch 266). As presently shown, each of graphical switches 262, 264, and 266 are in the "ON" position, thus indicating that image alteration effects may be applied during the display of image data by each of the listed applications. The configuration of device operation events 260 is represented by an audio menu button 270, a motion menu button 272, a location menu button 274, and a "camera data" motion button 276. Each of the menu buttons 270, 272, 274, and 276 may include respective status indicators 278, which may inform a user as to whether a triggering event has been defined or configured for a particular type of device operation event. For instance, in the present screen 256, status indicators 278 show that at least one audio event for triggering image alteration is presently defined, but that events for triggering image alteration based on motion, location, or camera data (e.g., imaging properties), have not yet been defined. Screen 256 may also include graphical button 284, by which the user may select to return to screen 250. The configuration of triggering device operation events for each of the listed categories (e.g., audio, motion, location, imaging properties) is further illustrated in FIGS. 19 and 20.

Continuing to FIG. 19, the user may further configure audio events by selecting graphical menu item 270, thus advancing the user to screen 290, which may display various configuration options relating to audio events. For example, screen 290 may include graphical switches 292 and 294, which may allow the user to select an audio source that is used in determining audio events. In the present configuration, device 50 may be configured such that audio events may be determined based on both audio data (e.g., music files played back on device 50), or based on audio signals received by audio input device 40 (e.g., voice or audio data from an external source). Screen 290 also includes drop-down selection field 296, by which a user may select a particular type of image alteration effect that is to be applied when an audio event is detected. As shown, the currently selected image alteration effect may be the water reflection effect (156) shown in FIG. 8.

Screen 290 further includes various options, generally referred to by reference number 300, which may allow the user to define the type or types of audio event(s) that may trigger image alteration using the effect specified by drop-down selection field 296. For instance, in the present configuration, water reflection effect 156 may be responsive to the tempo, bass content level, and volume of an audio signal, as indicated by the position of graphical switch 304, the status of menu item 306, and the position of graphical switch 308, respectively. Screen 290 also displays options for enabling image alteration effects in response to key changes or even genre (e.g., determined via metadata analysis of audio data), as shown by graphical switches 310 and 312, respectively. As shown in the present configuration, graphical switches 310 and 312 are shown in the "OFF" position. However, it should be understood that the user may decide at a later time to toggle graphical switches 310 and/or 312 to the "ON" position in order to enable image alteration based upon key changes and genre data. Once the desired audio event settings are selected, the user may return to screen 256 via selection of graphical button 314.

From screen 256, the user may continue to the configuration of motion events by selecting graphical menu item 272. As shown in FIG. 19, the selection of graphical menu 272 advances the user to screen 318, which may display various configuration options relating to motion events. For instance, the user may enable a motion sensing device (e.g. 36), such as an accelerometer, by toggling switch 320 to the "ON" position. This may configure device 50 to track motion based on accelerometer data. The user may also define types of motion events that trigger image alteration. For instance, in the present configuration, graphical menu item 322 indicates that image alteration may be triggered by continuous rotation of device 50. As will be appreciated, selection graphical menu item 322 may also allow the user to select other types of rotation events, such a 90 degree or 180 degree rotation. Graphical switch 324 is similarly shown in the "ON" position, thus indicating that a shaking motion may also trigger image alteration.

Screen 318 additionally includes drop-down selection field 326, through which a user may select a particular type of image alteration effect that is to be applied when a rotation or shake event is detected. For instance, in the present embodiment, the user may select from one of a brush-stroke effect (FIG. 13), a water reflection effect (FIG. 14), or a spiral effect (FIG. 11). Screen 318 also includes graphical switch 328, currently in the "ON" position. This option may enable the application of a randomly selected image alteration effect when a shake event is detected, as discussed above in FIG. 12. Once the desired motion event settings are selected, the user may return to screen 256 by selecting graphical button 314 on screen 318.

FIG. 20 illustrates the configuration of device operation events associated with location and imaging properties of device 50. As shown in screen 256, status indicator 278 for graphical menu item 272, relating to motion, has been updated based upon the configuration steps shown in FIG. 19. To further configure location event settings, the user may select graphical menu item 274 to access screen 334. As shown, screen 334 may provide drop-down selection fields 336 and 338, by which a user may specify certain geographic locations that may trigger the application of a particular image alteration effect, such as a color filter effect (FIG. 16). For instance, the present configuration shows the selection of a first location "HOME" in field 336 and a second location "WORK" in field 338. As can be appreciated, the selected locations, HOME and WORK, may correspond to geographic coordinates determined by positioning device 38, which may be a GPS device.

Drop-down selection fields 336 and 338 may be associated with drop-down selection fields 340 and 342, respectively, each of which may be used to select a particular color filter effect that is to be applied when device 50 is determined to be in one of the specified locations (e.g., HOME or WORK). For instance, when it is determined that device 50 is at location HOME, a blue color filter effect may be applied, as indicated by selection field 340. When it is determined that device 50 is at location WORK, a red color filter effect may be applied, as indicated by selection field 342. Additionally, as shown in screen 334, the user may define additional geographic locations for triggering image alteration by selecting graphical button 344. Once the desired location event settings are configured, the user may return to screen 256 by selecting graphical button 314.

Referring back to screen 256, the user may select graphical menu item 276 to access screen 350 for the configuration of triggering events based upon imaging properties, which may be determined by camera 74 and ISP 106. For instance, screen 350 includes graphical switches 352, 354, and 356, which may be toggled by the user to specify whether image alteration effects are to be applied based upon lighting conditions (switch 352), a sharpness level (switch 354), or an exposure value (switch 356). As shown in the present configuration, the user has specified that image alteration may be triggered by certain lighting conditions and exposure values. Screen 350 also includes drop-down selection field 358, through which an image alteration effect that is to be triggered by the selected lighting and exposure events is selected. For instance, in the present example, the user may select from either a thermal camera image effect, an x-ray image effect, a night-vision image effect, or a glow effect. Once the desired imaging property settings have been selected, the user may select graphical button 314 to return to screen 256. As shown in the updated screen 256, the status indicators 278 associated with menu items 276 and 278 are updated based upon the configuration steps depicted in screens 334 and 350.

As will be appreciated, the effects and options shown in FIGS. 18-20 are simply provided by way of example and, in an actual implementation, many other types of image alteration effects, such as those provided by Apple Inc.'s Photo Booth® software, may be selected. Further, it should be understood that the illustrated embodiments are not intended to be limited to the precise user interface conventions depicted herein. Rather, additional embodiments may include a wide variety of user interface styles.

Figure 21:
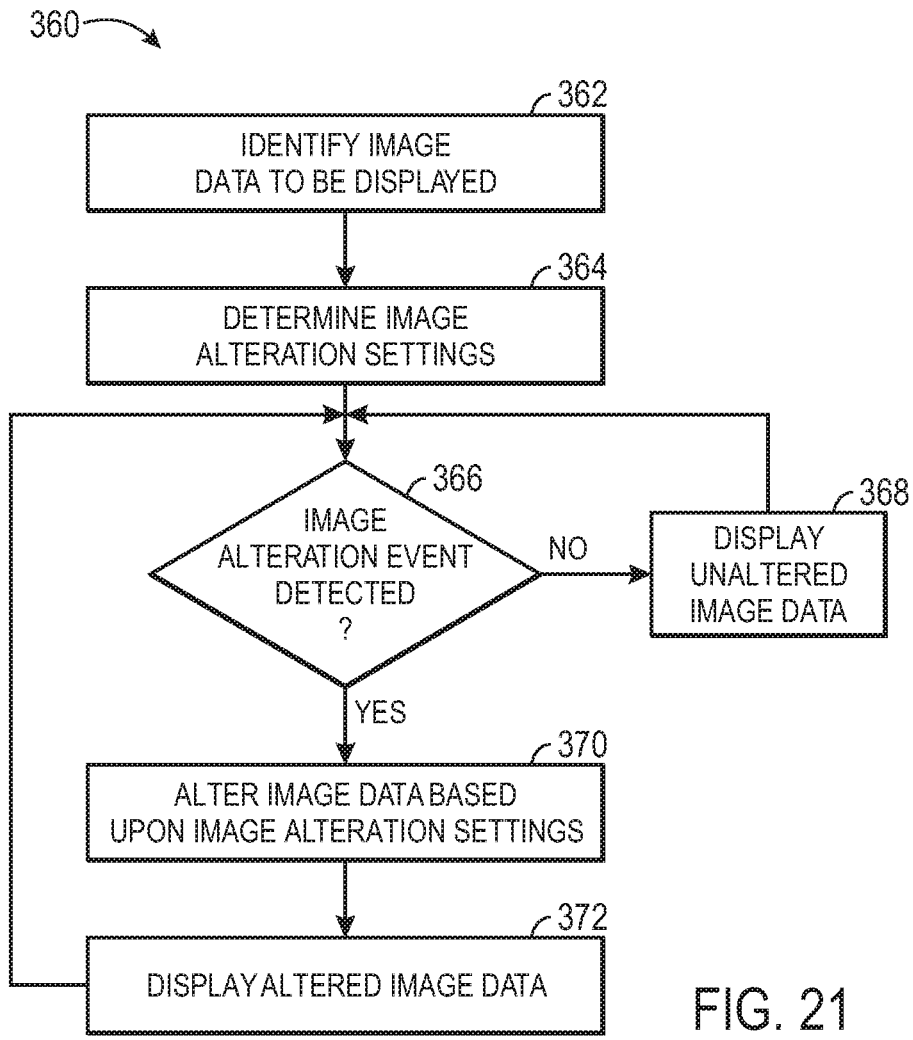
FIG. 21 is a flow chart depicting a method for altering image data based upon one or more device operation events, in accordance with aspects of the present disclosure.

The image alteration techniques discussed above may be further illustrated with reference to FIG. 21, which shows a flowchart depicting a method 360 for altering image data based upon one or more device operation events, in accordance with aspects of the present disclosure. Method 360 begins at step 362, in which image data that is to be displayed on a device, such as electronic device 10 or handheld device 50, is identified. The identification of the image data may depend on user interaction with a particular application on electronic device 10. For instance, if video file 128 (FIG. 5) is selected for playback using media player application 62 on device 50, the identified image data may be the video data stored in video file 128. Alternatively, if camera application 64 is running and acquiring live image data 174, then live image data 174 may be the image data identified at step 362.

Next, at step 364, image alteration settings are determined. By way of example, step 364 may include assessing the various user preferences 92 stored on device 50. For instance, image alteration settings may include one or more image alteration rules which define the type or types of image alteration effect(s) that are to be applied in response to certain device operation events. As shown in FIGS. 18-20, user preferences 92 may be configured using a plurality of graphically displayed selection fields, switches, and other graphical elements making up a graphical user interface (GUI 58) running on device 50. Once user preferences 92 have been determined, method 360 may continue from step 364 to decision block 366, in which a determination is made as to whether a device operation event that triggers image alteration, such as an audio, motion, location, or image capture event, is presently occurring. Is no such event is detected, the image data identified at step 362 is not altered, and method 360 continues to step 368, whereby the unaltered image data is displayed (e.g., on display 28). Step 368 may then return to decision block 366.

If decision block 366 detects a triggering device operation event, then method 360 proceeds to step 370, and the image data identified at step 362 is altered in accordance with the determined image alteration settings from step 364. Referring to FIG. 9 by way of example, if a particular bass content level in an audio file being played back (e.g., concurrently with the display of the identified image data from step 362) on device 50 is at a certain value, a zooming effect that changes the depth of the displayed image data may be applied. Thereafter, the altered image data is displayed on the device, as indicated by step 372. From step 372, method 360 may return to decision block 366, thus repeating the image alteration process.

Figure 22:
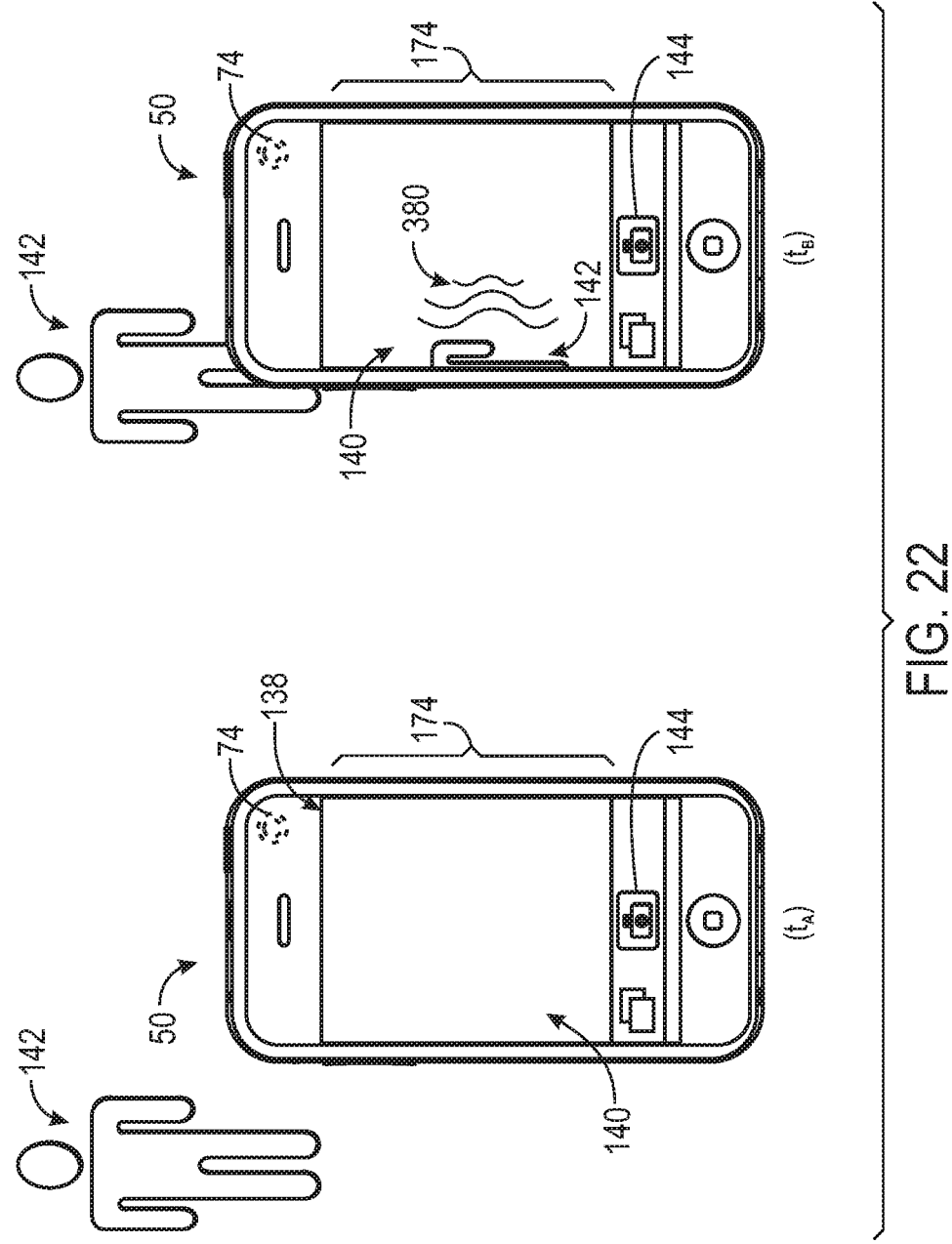
FIG. 22 is an embodiment in which an image alteration effect is applied to image data acquired in substantially real time and displayed on the electronic device of FIG. 2 in response to detecting a change in the real time image data.

Another embodiment of the image alteration techniques set forth herein is further illustrated in FIG. 22. In particular, FIG. 22 illustrates the application of an image alteration effect based upon the detection of a subject entering or, in some instances, exiting an image acquisition frame. By way of example, the image acquisition frame may be provided by viewfinder 140 displayed on screen 138 of device 50. As discussed above, screen 138 may be part of camera application 64, and view finder 140 may display live image 174, which may represent an image scene being captured by camera 74 in substantially real time.

As shown, at time $t_A$, subject 142 is positioned relative to device 50, such that subject 142 is not captured by camera 74 and, therefore, does not appear in viewfinder 140. Subsequently, at time $t_B$, the position of subject 142 relative to the position of device 50 has changed such that subject 142 has just entered the left side of viewfinder 140. As will be appreciated, the change in relative positions of subject 142 and device 50 may be the result of movement by subject 142, movement by device 50, or movement by both subject 142 and device 50. In accordance with the present embodiment, an image capture event occurs when it is detected that subject 142 has entered viewfinder 140 and, thus, is at least partially visible in the live image 174. This may cause image alteration effect 380 to be applied at time $t_B$, which is shown as being a "wave-like" effect emanating from subject 142 in the live image. However, it should be appreciated that the presently illustrated image capture event may be used to apply any suitable type of image alteration effect, including any of the effects discussed in the embodiments above. Further, in some embodiments, another image capture event may occur when subject 142 leaves viewfinder 140, and another corresponding image alteration effect may be applied.

As will be appreciated, the various techniques described above and relating to alteration of image data based upon one or more device operation events are provided herein by way of example only. Accordingly, it should be understood that the present disclosure should not be construed as being limited to only the examples provided above. Indeed, many variations and combinations of the image alteration rules (e.g., an image alteration effect triggered by a particular event) set forth above may exist. Further, it should be appreciated that the above-discussed image alteration techniques may be implemented in any suitable manner. For instance, image processing logic 30 may be implemented using hardware (e.g., suitably configured circuitry), software (e.g., via a computer program including executable code stored on one or more tangible computer readable medium), or via using a combination of both hardware and software elements. Through use of the disclosed image alteration techniques, a user may be able to exercise greater creativity in generating and displaying altered images that are not only creative, but also aesthetically pleasing. In this manner, the user may experience greater satisfaction when viewing such images, thereby improving the user's experience when interacting with electronic devices, such as devices 10 or 50.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for altering image data on an electronic device, comprising:

detecting motion of an object in a subset of a sequence of captured image frames on a display of an electronic device;

applying an image alteration effect to the subset of the sequence of captured image frames to change an appearance of the subset of the sequence of captured image frames in response to the detected motion of the object, wherein the image alteration effect is determined based upon at least one image alteration rule in a set of image alteration rules, the set comprising image alteration rules responsive to at least a motion of an object, and further responsive to one or more of an audio event, a motion event, a location event, and an image capture event; and displaying the changed subset of the sequence of captured images on the display.

2. The method of claim 1, comprising increasing the intensity of the applied image alteration effect based upon the duration of time over which the detected motion of the object continuously occurs or based upon the velocity of the detected motion of the object, or based upon a combination thereof.

3. The method of claim 2, wherein the intensity of the applied image alteration effect gradually subsides when the detected motion of the object ends.

4. The method of claim 1, wherein the detected motion of the object comprises a subject entering the depth of field of a camera on the electronic device.

5. A non-transitory computer readable medium encoded with a computer program, the program comprising instructions that when executed by a data processing apparatus cause the data processing apparatus to:

display a sequence of captured image frames on a display device;

detect motion of an object in a subset of the sequence of captured image frames;

select an image alteration rule based on the detected motion of the object, wherein the image alteration rule is further responsive to one or more of an audio event, a motion event, a location event, and an image capture event;

apply the selected image alteration rule to the subset of the sequence of captured image frames;

generate an image alteration effect based on application of the selected image alteration rule to the subset of the sequence of captured image frames; and display the image alteration effect on the display device.

6. The non-transitory computer readable medium of claim 5, further comprising instructions that when executed by the data processing apparatus cause the data processing apparatus to increase the intensity of the applied image alteration effect based upon one or more of:

a duration of time over which the detected motion continuously occurs; and the velocity of the detected motion.

7. The non-transitory computer readable medium of claim 6, wherein the instructions that cause the data processing apparatus to increase the intensity of the applied image alteration effect comprise instructions that cause the data processing apparatus to gradually decrease the intensity of the applied image alteration effect when the detected motion of the object ends.

8. The non-transitory computer readable medium of claim 5, wherein the detected motion of the object comprises a subject entering the depth of field of a camera.

9. The non-transitory computer readable medium of claim 5, wherein the detected motion of the object comprises a subject exiting the depth of field of a camera.

10. A non-transitory computer readable medium encoded with a computer program, the program comprising instructions that when executed by a data processing apparatus cause the data processing apparatus to:

display a sequence of captured image frames on a display device;

detect motion of an object in a subset of the sequence of captured image frames;

select an image alteration rule based on the detected motion of the object;

apply the selected image alteration rule to the subset of the sequence of captured image frames;

generate an image alteration effect based on application of the selected image alteration rule to the subset of the sequence of captured image frames;

display the image alteration effect on the display device;

increase the intensity of the applied image alteration effect based upon one or more of a duration of time over which the detected motion continuously occurs and the velocity of the detected motion; and gradually decrease the intensity of the applied image alteration effect when the detected motion of the object ends.

* * * * *